(12) United States Patent
Mukherjee

(10) Patent No.: US 11,176,137 B2
(45) Date of Patent: Nov. 16, 2021

(54) QUERY PROCESSING PLATFORM FOR PERFORMING DYNAMIC CLUSTER COMPACTION AND EXPANSION

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

(*) Notice: Subject to any disclaimer, the term of this patent is extended or adjusted under 35 U.S.C. 154(b) by 168 days.

(21) Appl. No.: 16/794,426

(22) Filed: Feb. 19, 2020

(65) Prior Publication Data

US 2021/0256025 A1 Aug. 19, 2021

(51) Int. Cl.
*G06F 16/00* (2019.01)
*G06F 16/2453* (2019.01)
*G06F 16/2455* (2019.01)

(52) U.S. Cl.
CPC .. *G06F 16/24549* (2019.01); *G06F 16/24542* (2019.01); *G06F 16/24561* (2019.01)

(58) Field of Classification Search
None
See application file for complete search history.

(56) References Cited

U.S. PATENT DOCUMENTS

| 8,407,253 | B2 | 3/2013 | Ryu et al. |
| 9,547,823 | B2 | 1/2017 | Hu et al. |
| 9,600,769 | B1 | 3/2017 | Liu et al. |
| 9,998,472 | B2 | 6/2018 | VerWeyst et al. |
| 10,078,651 | B2 | 9/2018 | Kelly et al. |
| 10,140,384 | B2 | 11/2018 | Sathish et al. |
| 10,296,524 | B1 | 5/2019 | Tung et al. |
| 10,311,050 | B2 | 6/2019 | Beller et al. |
| 10,324,973 | B2 | 6/2019 | Circlaeys et al. |
| 10,349,134 | B2 | 7/2019 | Hamiti et al. |
| 10,380,187 | B2 | 8/2019 | Hassanzadeh et al. |
| 10,423,652 | B2 | 9/2019 | Zhai et al. |
| 10,467,290 | B1 | 11/2019 | Wu et al. |
| 10,474,949 | B2 | 11/2019 | Majumdar et al. |

(Continued)

*Primary Examiner* — Augustine K. Obisesan
(74) *Attorney, Agent, or Firm* — Banner & Witcoff, Ltd.; Michael A. Springs

(57) ABSTRACT

Aspects of the disclosure relate to dynamic cluster compaction and expansion for query processing. A computing platform may receive information associated with an abstracted information cluster and may store the information as a first table containing the information and corresponding adjacency information. Subsequently, the computing platform may receive a query requesting a subset of the information and additional information not associated with the abstracted information cluster. Using the first table, the computing platform may identify the subset of the information and corresponding adjacency information. Then, the computing platform may identify a location of the additional information, and may access, from the identified location, a second table containing the additional information and corresponding adjacency information. Based on the subset of the information and its corresponding adjacency information, and the additional information and its corresponding adjacency information, the computing platform may send a response to the query.

20 Claims, 20 Drawing Sheets

(56) References Cited

U.S. PATENT DOCUMENTS

| | | | |
|---|---|---|---|
| 10,482,139 B2 | 11/2019 | Khaitan et al. | |
| 10,489,982 B2 | 11/2019 | Johnson et al. | |
| 10,528,871 B1 | 1/2020 | Gramatica et al. | |
| 10,565,508 B2 | 2/2020 | Merdivan et al. | |
| 2007/0050346 A1* | 3/2007 | Goel | G06F 16/9038 |
| 2009/0193019 A1* | 7/2009 | Hassan | G06Q 10/107 |
| 2013/0124525 A1* | 5/2013 | Anderson | G06F 16/278 |
| | | | 707/737 |
| 2014/0297644 A1 | 10/2014 | Cheng | |
| 2019/0163835 A1 | 5/2019 | Scheideler et al. | |
| 2019/0354624 A1* | 11/2019 | Seshadri | G06F 16/23 |

\* cited by examiner

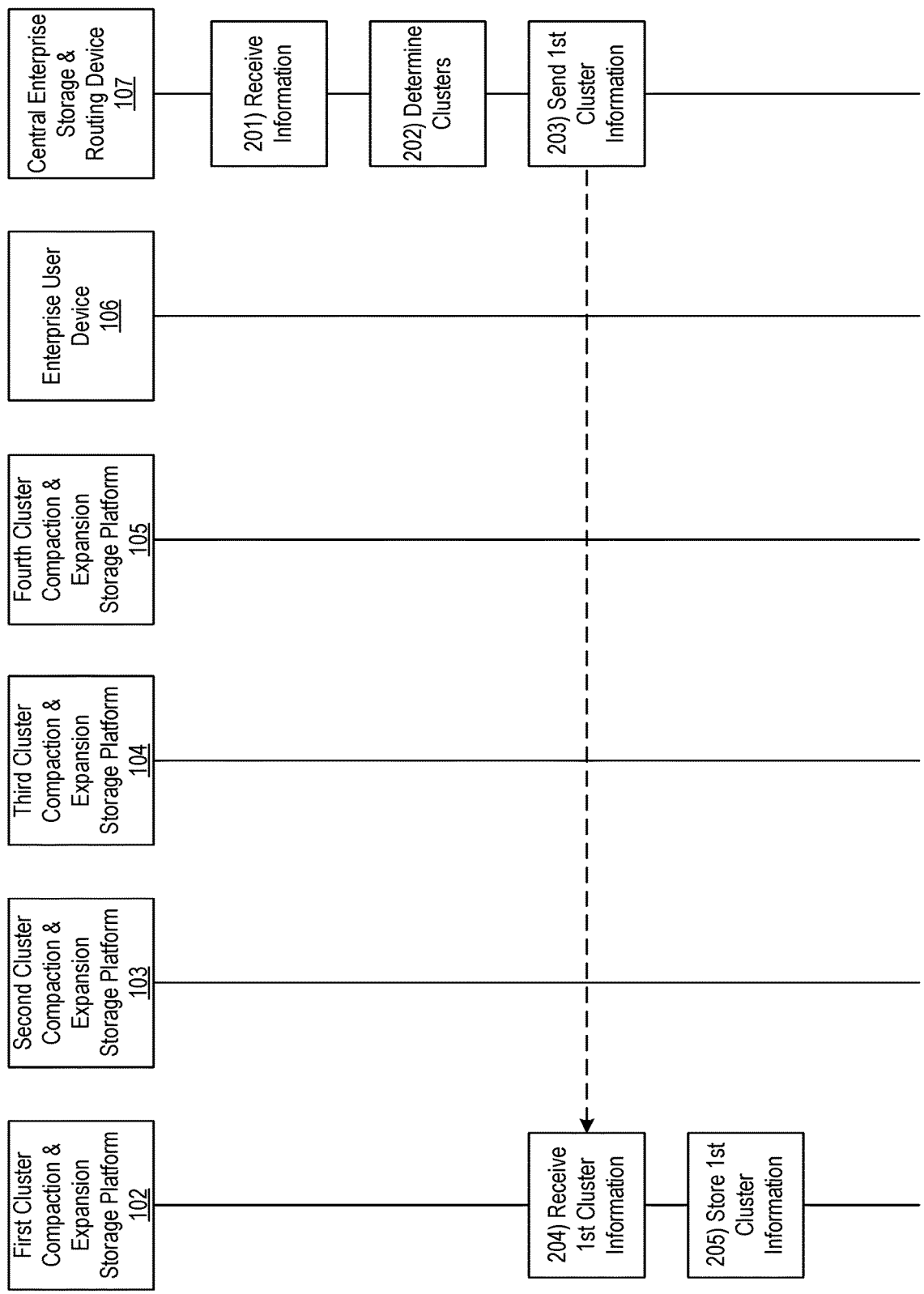

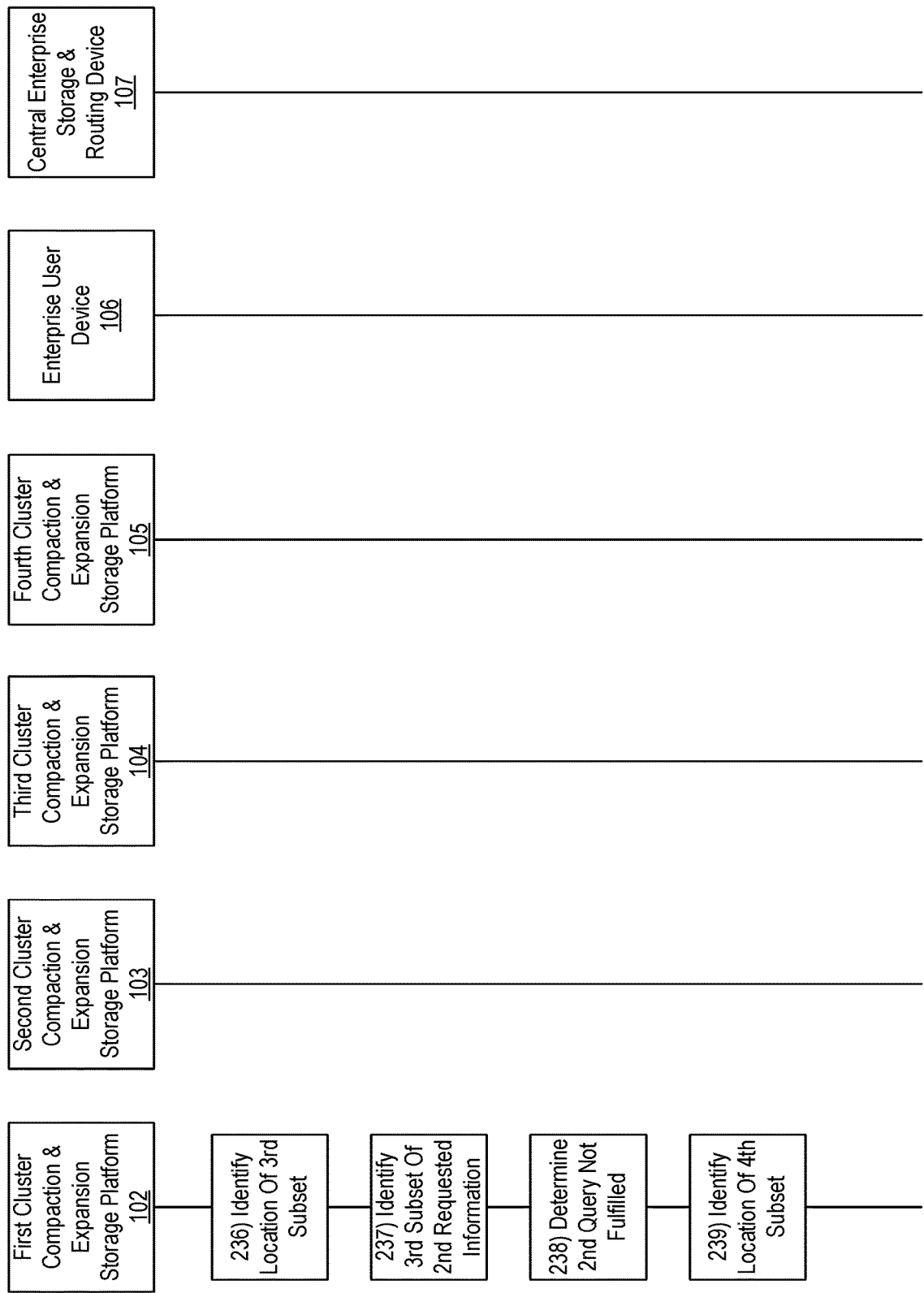

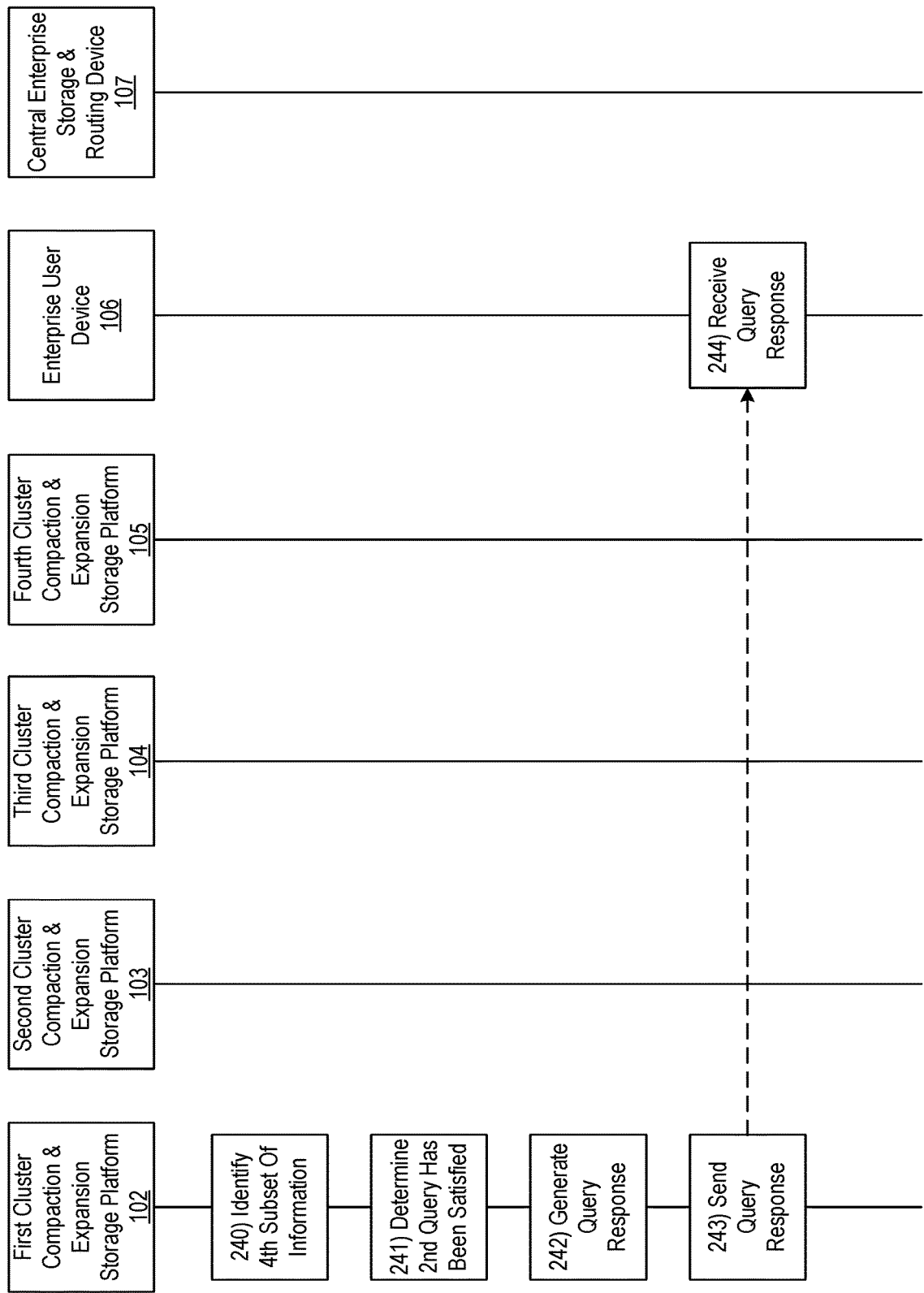

305

Query Response Interface

The spouse of Person #1 is Person #2. His accounts are listed below:

Account #1

Account #2

Account #3

Query Response Interface

Person #1 has four residences, as listed below:

Address #1

Address #2

Address #3

Address #4

FIG. 4

QUERY PROCESSING PLATFORM FOR PERFORMING DYNAMIC CLUSTER COMPACTION AND EXPANSION

BACKGROUND

Aspects of the disclosure relate to query processing platforms. In particular, one or more aspects of the disclosure relate to computing platforms that implement dynamic cluster compaction and expansion to enable and enhance query processing.

In some cases, enterprise organizations (such as financial institutions) may implement traditional knowledge graphs to maintain account information, or the like. In some instances, these knowledge graphs may be stored in a distributed manner, as the graphs may contain a volume of data too large for a single computing device. Knowledge graphs may be a useful tool for managing information due to the convenient nature in which they may capture relationships between information, as well as the distributed manner in which they store information (e.g., because this distributed approach may reduce the risk of loss in the event of a breach of a single data source). Due to the distributed nature of these graphs, however, there may be inefficiencies when performing information retrieval for query processing. For example, the distributed nature of knowledge graphs may result in a significant amount of latency and delay in query processing due to the exchange of information across a distributed environment. This latency and delay may reduce the appeal of knowledge graphs for enterprise organizations (such as financial institutions) that want to minimize query response time. As a result, it may be difficult for enterprise organizations, such as financial institutions, to efficiently and effectively use knowledge graphs in query processing.

SUMMARY

Aspects of the disclosure provide effective, efficient, scalable, and convenient technical solutions that address and overcome the technical problems associated with implementing and using knowledge graphs in various use cases, such as consumer banking, natural language processing, software, social networks, or the like. For example, some aspects of the disclosure provide techniques that enable computing devices to reduce latency and delay when processing knowledge graph queries in a distributed storage environment by using information clustering, compaction, and expansion. In doing so, various technical advantages may be realized. For example, one technical advantage of the knowledge graphs described herein over traditional data storage methods is the convenient nature in which relationships between data points may be maintained. A further advantage of the information clustering, compaction, and expansion techniques described herein is reduced network latency and improved query response time when processing knowledge graph queries. Yet an additional technical advantage of the knowledge graphs described herein is the distributed manner in which they are stored, as this distributed arrangement may reduce risk of a complete network data breach, as data may be stored at a plurality of different storage devices. By applying the clustering, compaction, and expansion techniques described herein to storing knowledge graphs, these and/or other technical advantages may be realized in the context of query processing.

In accordance with one or more embodiments of the disclosure, a computing platform comprising at least one processor, a communication interface, and memory storing computer-readable instructions may receive information associated with a first abstracted information cluster. Next, the computing platform may store the information associated with the first abstracted information cluster as a first table such as a hash table containing the information associated with the first abstracted information cluster and corresponding adjacency information. Subsequently, the computing platform may receive a query requesting a subset of the information associated with the first abstracted information cluster and additional information not associated with the first abstracted information cluster. Using the first table, the computing platform may identify the subset of the information associated with the first abstracted information cluster and corresponding adjacency information. Then, the computing platform may identify a location of the additional information not associated with the first abstracted information cluster. In addition, the computing platform may access, from the identified location of the additional information not associated with the first abstracted information cluster, a second table—such as a hash table containing: the additional information not associated with the first abstracted information cluster, and corresponding adjacency information. Based on 1) the subset of the information associated with the first abstracted information cluster and the corresponding adjacency information, and 2) the additional information not associated with the first abstracted information cluster and the corresponding adjacency information, the computing platform may send a response to the query.

In one or more instances, the computing platform may identify the location of the additional information not associated with the first abstracted information cluster by: 1) determining that the additional information not associated with the first abstracted information cluster is not stored locally at the computing platform, 2) in response to determining that the additional information not associated with the first abstracted information cluster is not stored locally at the computing platform, sending, to a central enterprise storage, a request for a location of the additional information not associated with the first abstracted information cluster, and 3) in response to the request for the location of the additional information not associated with the first abstracted information cluster, receiving a message indicating the location of the additional information not associated with the first abstracted information cluster, which may be the second hash table.

In one or more instances, the computing platform may identify the location of the additional information not associated with the first abstracted information cluster by: 1) determining that the additional information not associated with the first abstracted information cluster is not stored locally at the computing platform, and 2) using the first table, identifying a location of the additional information not associated with the first abstracted information cluster, which may be the second table. In one or more instances, the computing platform may identify the location of the additional information not associated with the first abstracted information cluster by identifying another computing platform, different than the computing platform, where the additional information not associated with the first abstracted information cluster is stored.

In one or more instances, the computing platform may accessing the second table by: 1) generating one or more commands directing another computing platform, on which the second table is stored, to provide the additional information not associated with the first abstracted information cluster, and 2) in response to the one or more commands directing the other computing platform, on which the second table is stored, to provide the additional information not associated with the first abstracted information cluster, receiving the additional information not associated with the first abstracted information cluster. In one or more instances, the computing platform may determine that the additional information not associated with the first abstracted information cluster is stored in a second abstracted information cluster, different than the first abstracted information cluster.

In one or more instances, the first abstracted information cluster may correspond to a first social network and the second abstracted information cluster may correspond to a second social network. In one or more instances, the first abstracted information cluster may correspond to a first geographic region and the second abstracted information cluster may correspond to a second geographic region. In one or more instances, adjacency information for the second abstracted information cluster may be stored at another computing platform and might not be stored at the computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2K depict an illustrative event sequence for implementing dynamic cluster compaction and expansion for query processing in accordance with one or more example embodiments;

FIGS. 3 and 4 depict illustrative user interfaces for implementing dynamic cluster compaction and expansion for query processing in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 6:
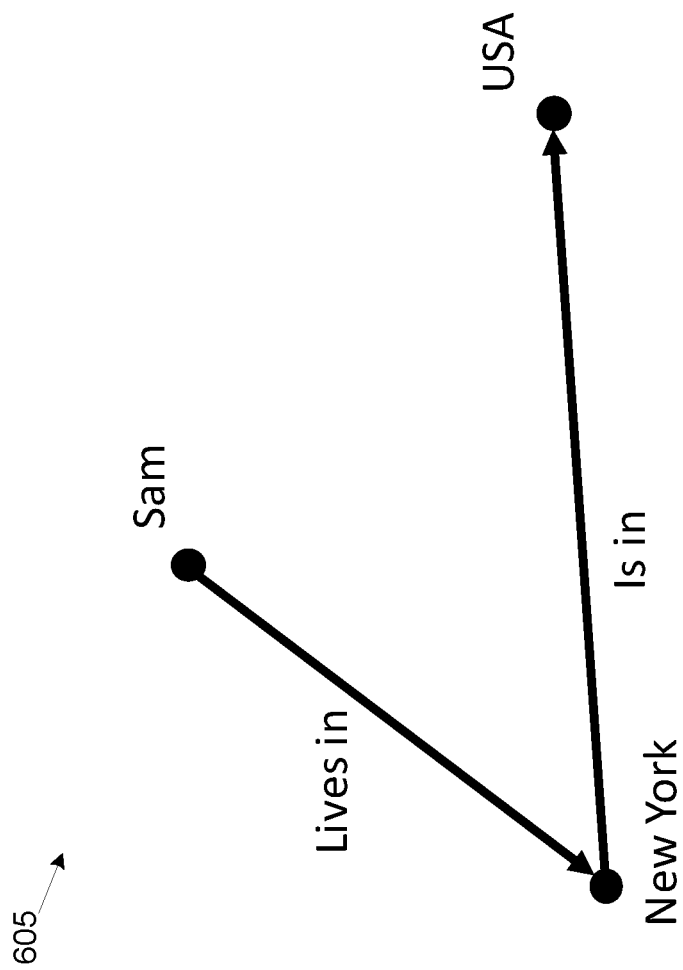
FIGS. 6-10 depict illustrative knowledge graphs for implementing dynamic cluster compaction and expansion for query processing in accordance with one or more example embodiments.

As a brief introduction to the concepts described further herein, one or more aspects of the disclosure provide systems and methods to efficiently and effectively manage and process queries through selective compaction and expansion of knowledge graphs. A knowledge graph is a graphical representation of knowledge and information that may be used in various artificial intelligence applications to capture relationships between attributes. A knowledge graph may be a graphical representation of an abstraction of relationships among related entities. In some instances, the entities in a knowledge graph may be represented by nodes and all attributes of each of the entities may be stored along with the nodes. In these instances, related nodes may be connected by directed or undirected edges. These edges may describe the relationships among those nodes or entities. An example of a simple knowledge graph is shown in knowledge graph 605, which is illustrated in FIG. 6. For example, the information "Sam lives in New York" may be represented by a simple knowledge graph having two nodes ("Sam" and "New York" with a directed edge connecting the "Sam" node to the "New York" node where the edge has the associated property describing the relationship "live in").

In some instances, knowledge graphs may be used for inferencing. For example, with regard to the "Sam lives in New York" example described above, another node "USA" may be added and another edge may be added connecting "New York" with "USA" with the property "is in." Accordingly, in this example, a resulting knowledge graph may capture the information "Sam lives in New York" and "New York is in USA." Thus, the resulting knowledge graph may be used to infer "Sam lives in USA."

Knowledge graphs are useful in several areas of artificial intelligence due to the convenient nature in which they may capture relationships. As an example, in consumer banking, a person may be represented as a node who may be connected to several accounts, where each account may be connected to a financial institution, and each financial institution may be connected to a locality or jurisdiction. As another example, in natural language processing, a sentence or utterance may have several entities such as a subject, a predicate, or the like, where each of the entities is represented by a node that is connected by an edge representing a verb. As yet another example, in software, each software component may be represented by a node, and the nodes may be connected by edges representing output of one software component being input to another. As yet another example, a knowledge graph may be used to determine friend and family relationships among several individuals in a social network, and to infer if and/or how two or more individuals may be connected.

Figure 7:
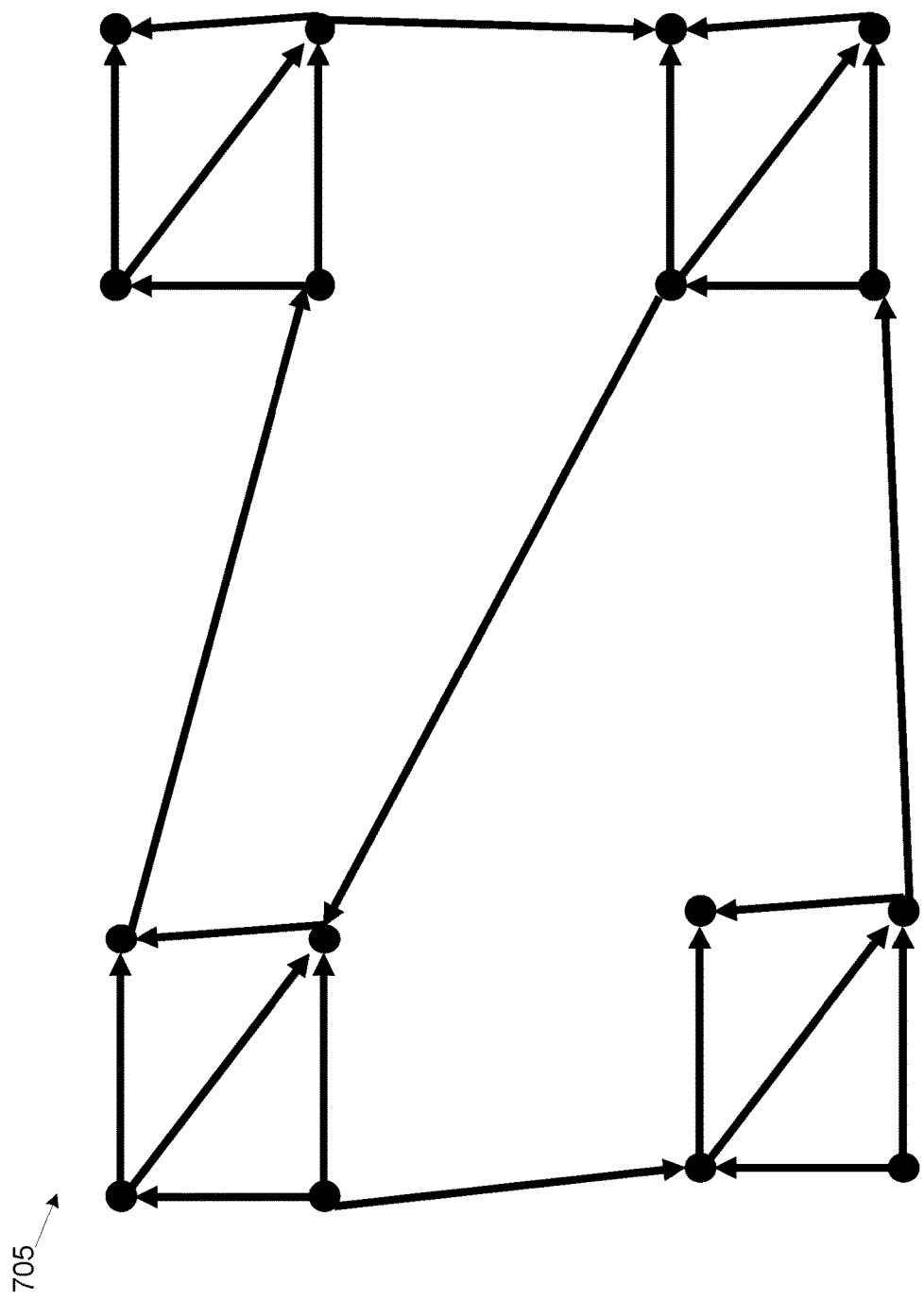

Although knowledge graphs may be a convenient way to represent entities, attributes, relationships, or the like, they may become large very quickly. For example, to use such knowledge graphs for inferences, a graph algorithm may traverse several nodes either in depth or breadth order first before coming to a decision. Accordingly, the large volume of data that needs to be stored in a knowledge graph due to their attributes and relationships might require that the graphs are stored in a distributed manner (e.g., because a single server might not be able to hold such a large volume of data). An example of a more complex knowledge graph than knowledge graph 605 is knowledge graph 705, which is shown in FIG. 7. It should be understood that although FIG. 7 shows four clusters of nodes, in a practical example such as a social network, a knowledge graph may have millions of nodes and billions of edges.

The collected nature of knowledge graphs that makes them attractive for representing relationships also may make it difficult to store the information in a distributed environment for retrieval. For example, in a distributed environment, information may be broken down into large pieces where each piece of the information is normally disconnected from the others. Accordingly, computations relying on access to information stored in the distributed environment would have to exchange data over a network, thus slowing down the computations. In the context of knowledge graphs, it may be preferable for information to be stored in a distributed environment, but this may create inefficiencies when information must be retrieved across the distributed environment. Accordingly, one or more of the systems and methods described herein provide selective compaction, expansion, and clustering in a distributed computing environment to address this technical deficiency and/or other technical problems.

Figure 8:
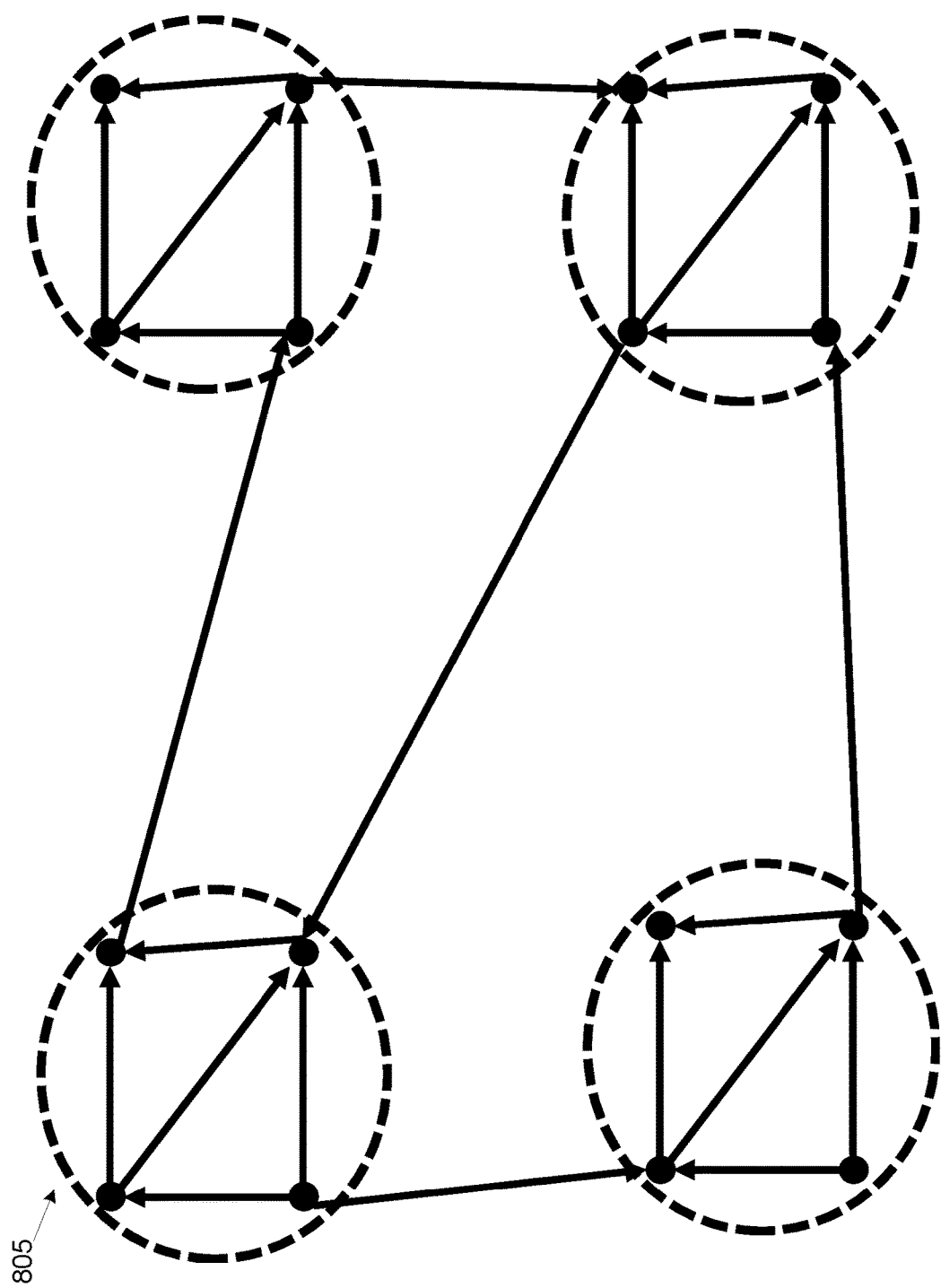

To begin, a computing platform may identify several groups of nodes that are more interconnected among one another than other nodes in the rest of a knowledge graph. For example, in a knowledge graph representing a social network, a family, group of school alumni, or the like may be more interconnected than any other nodes in the knowledge graph. Each such group may be referred to as a cluster, and whenever a new node is added, the computing device may determine whether or not the new node should belong to any existing clusters. This connectivity discovery and clustering process is illustrated in knowledge graph 805, which is shown in FIG. 8. For example, the knowledge graph 805 may be divided into several connected components and each connected component has nodes that are more interconnected to one another than to other such nodes.

Subsequently, each cluster containing several individual nodes and edges (and the corresponding connectivity/adjacency information) may now be represented by a single node. This newly created node representing a cluster may be referred to as a C-Node. In some instances, any adjacency information that connects one cluster to another cluster may be represented by edges connecting the C-Nodes representing those clusters. In these instances, the existing adjacency information of the original nodes and edges belonging to each cluster may be stored separately.

Figure 9:
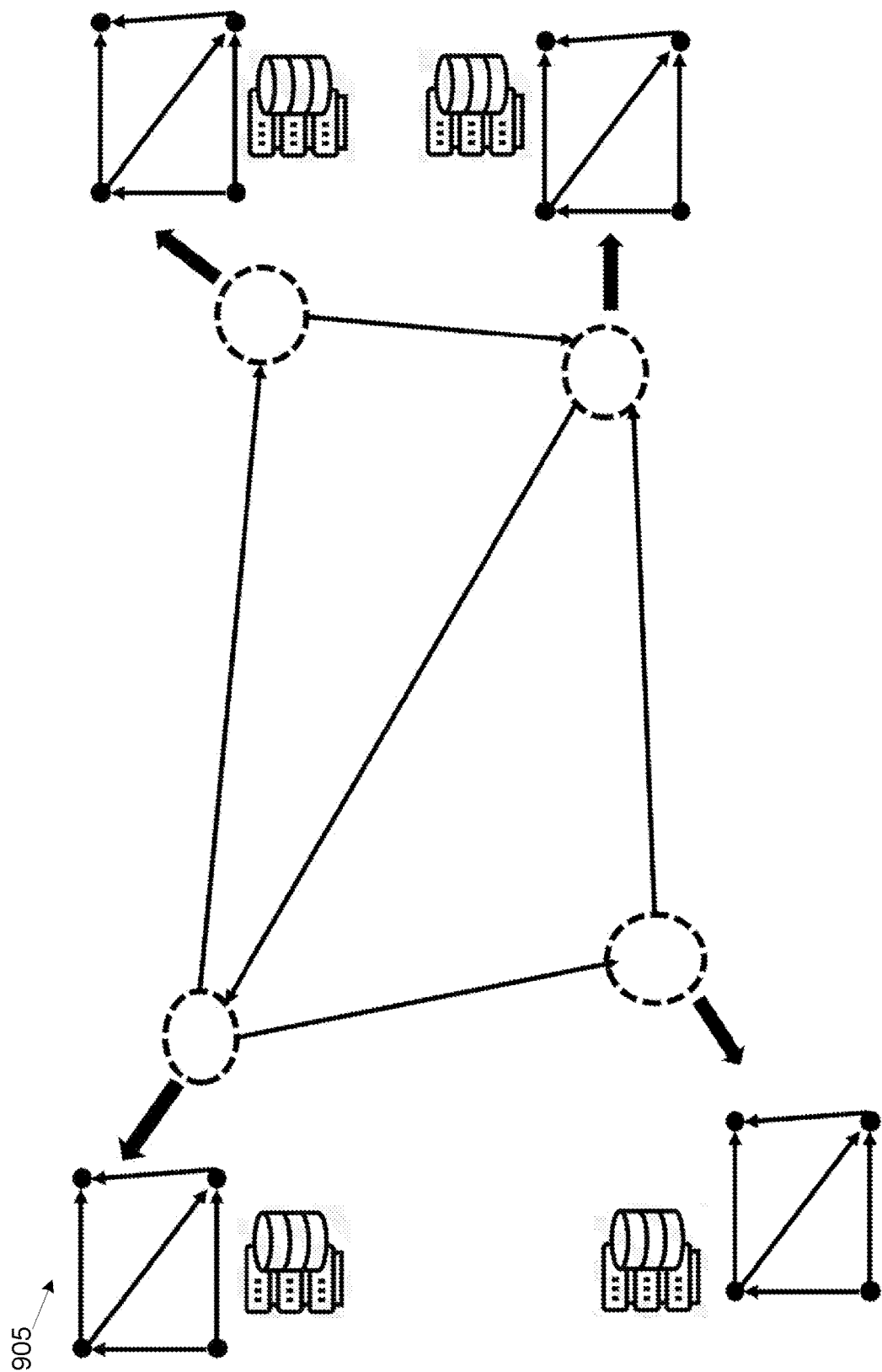

Accordingly, each cluster, now separated, may be stored in a distributed database. Generally, most graph traversal and information processing may be limited within the clusters, and thus it may be expected that most computation may be done in a parallel and distributed manner. As a result, this clustering may minimize network traffic and latency. This compaction and distributed storage method is shown with regard to knowledge graph 905, which is shown in FIG. 9. For example, knowledge graph 905 represents the knowledge graph 705 after clustering and compaction. In the compaction step, each of the connected components (as identified through clustering) are represented by a single node (e.g., a C-node). In some instances, the adjacency information of the connected components may be stored separately in a distributed database across distributed servers. Accordingly, in these instances, only the limited adjacency information of the clustered nodes may be stored separately.

In some instances, for faster information retrieval, a hash table may be used for each node that stores information as to which cluster the nodes belong to, which node represents the clusters, which distributed database is used to store the node, adjacency information of the cluster, or the like. These steps may be repeated on a regular basis to readjust and balance the clusters as additional nodes and edges are added and/or deleted.

When a particular node is needed to provide information following the edge of the knowledge graph, the computed hash tables may be used to determine where that node is. If the node belongs to the same cluster, the node and the pertaining information may be stored in the current server. In these examples, the computations might not create network latency.

Figure 10:
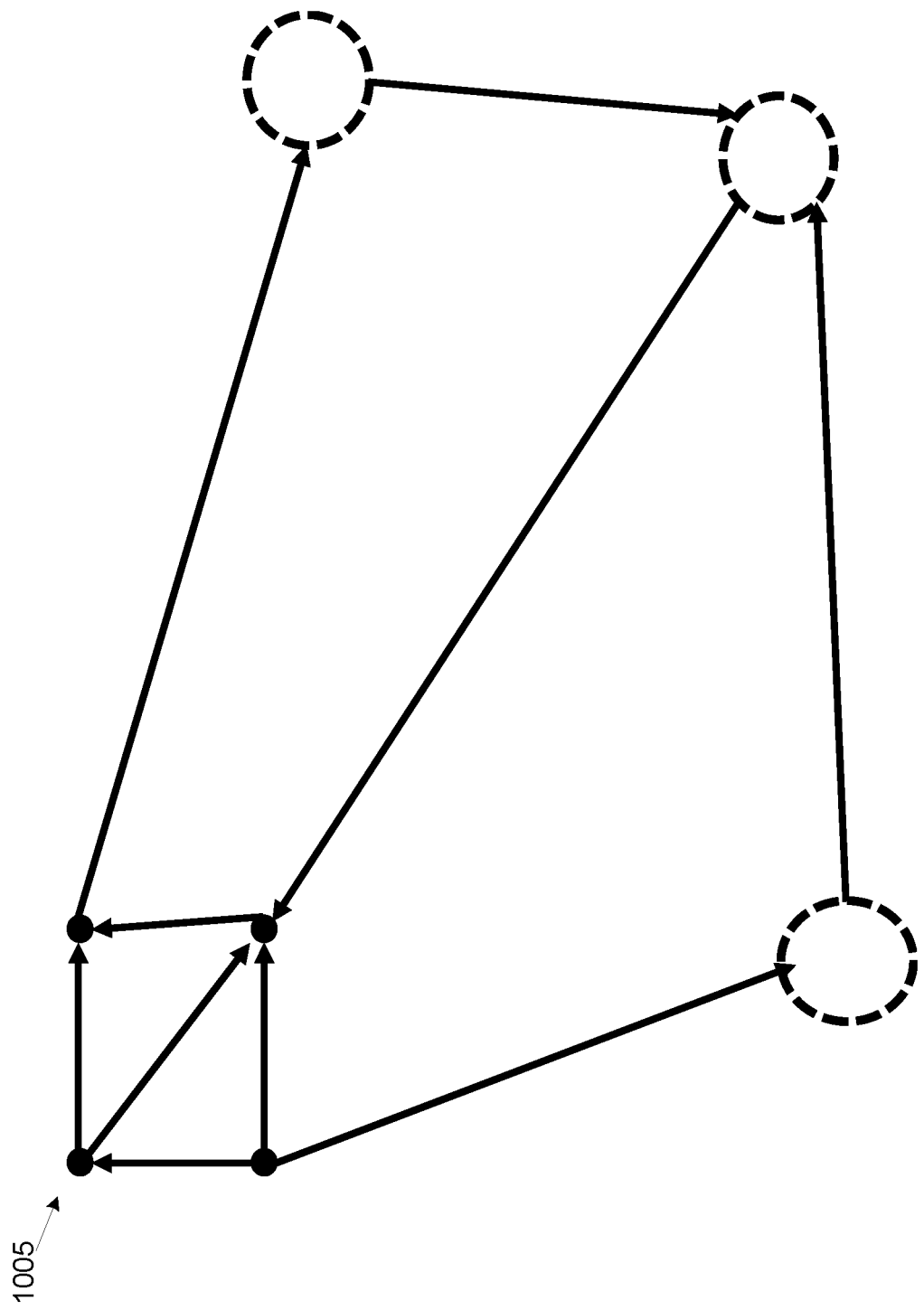

In contrast, if the hash table identifies that the node belongs to a different cluster, the corresponding C-Node is located and the cluster corresponding to that C-Node may be further expanded. After the information is obtained from the cluster expansion, it may be sent over the network. This is further illustrated in knowledge graph 1005, which is shown in FIG. 10. For example, FIG. 10 illustrates partial expansion of a compacted node (C-node) for traversal and computation. Additionally or alternatively, any large cluster may be broken down into multiple clusters and stored in different servers. These methods may be recursively repeated.

Accordingly, one or more of the systems and methods described herein may break down a single knowledge graph into clusters, and may store each cluster as a single compacted C-Node in a separate server. Further, one or more of the systems and methods described herein may perform limited expansion of each C-Node in an on-demand basis to increase parallelism in a distributed computing environment, and/or use a hash or lookup table to locate nodes and retrieve them in an on-demand basis. In doing so, one or more of the systems and methods described herein may store information in a distributed environment to achieve the technical advantages of knowledge graph implementations, while minimizing the inherent inefficiency of retrieving information across the distributed environment and the network latency.

Figure 1A:
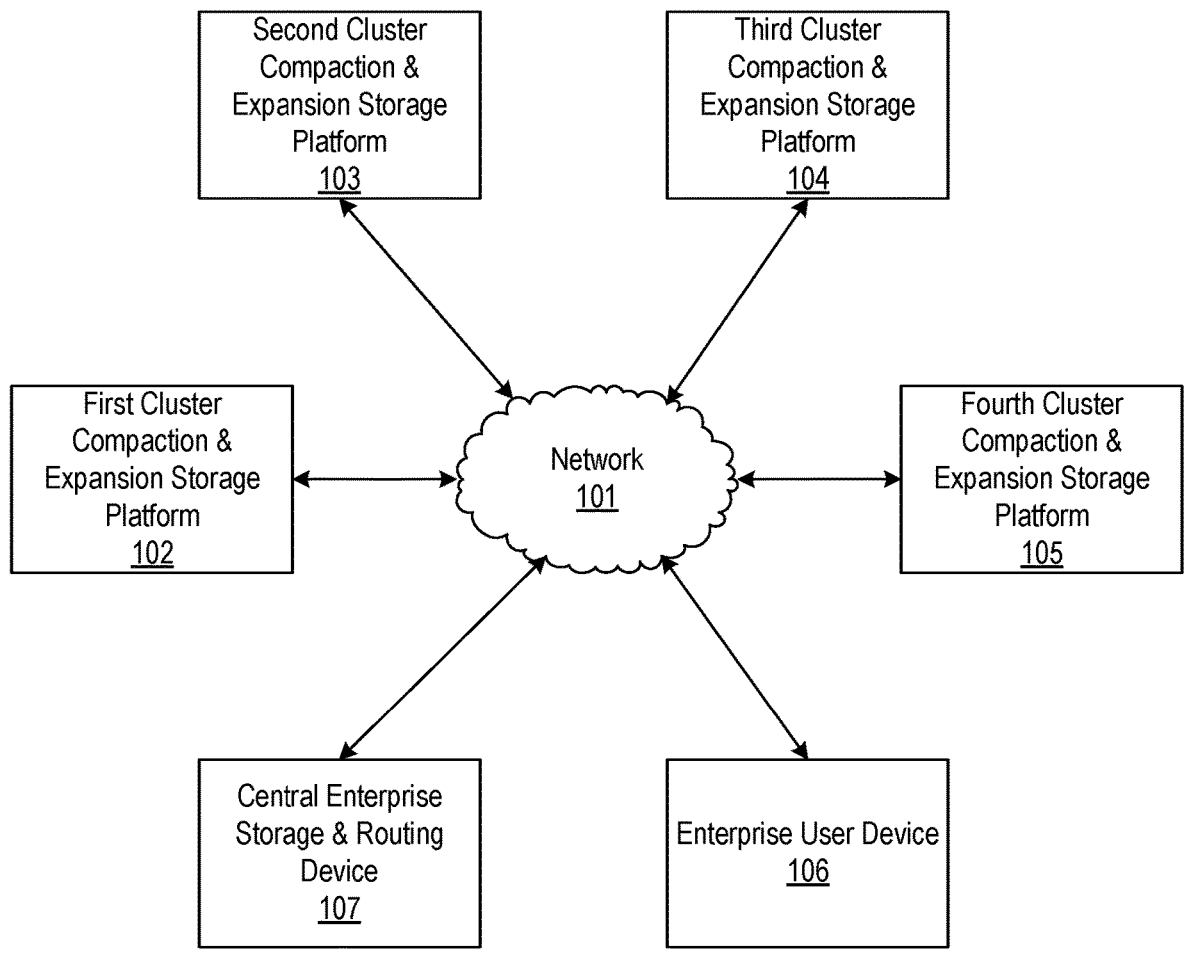
FIGS. 1A-1B depict an illustrative computing environment that implements dynamic cluster compaction and expansion for query processing in accordance with one or more example embodiments.
Figure 1B:
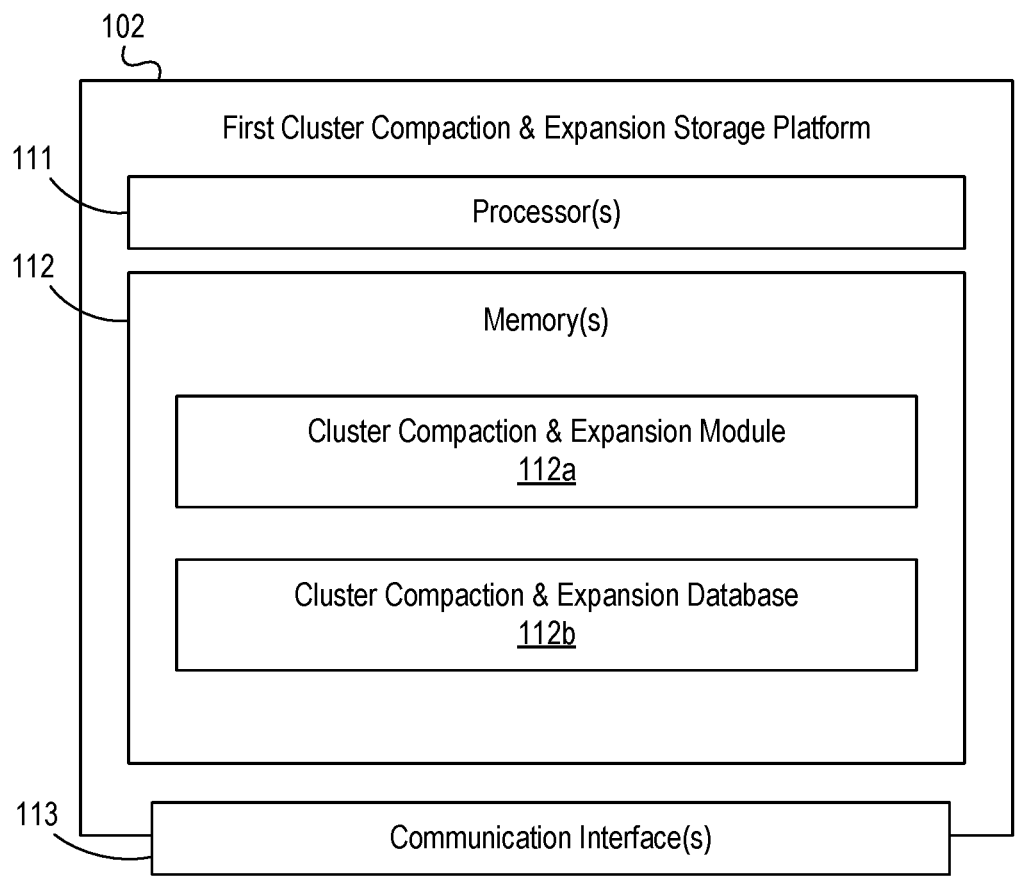

FIGS. 1A-1B depict an illustrative computing environment that implements dynamic cluster compaction and expansion for query processing in accordance with one or more example embodiments. Referring to FIG. 1A, computing environment 100 may include one or more computer systems. For example, computing environment 100 may include a first cluster compaction and expansion storage platform 102, a second cluster compaction and expansion storage platform 103, a third cluster compaction and expansion storage platform 104, a fourth cluster compaction and expansion storage platform 105, an enterprise user device 106, and a central enterprise storage and routing device 107.

As described further below, first cluster compaction and expansion storage platform 102 may be a computer system that includes one or more computing devices (e.g., servers, server blades, or the like) and/or other computer components (e.g., processors, memories, communication interfaces) that may be used to generate and maintain knowledge graphs and corresponding tables for query processing. In these instances, the first cluster compaction and expansion storage platform 102 may be configured to perform compaction and expansion of informational nodes stored at the first cluster compaction and expansion storage platform 102. Such informational nodes may correspond to, for example, customer information (e.g., address, account numbers, family members, or the like). In some instances, the first cluster compaction and expansion storage platform 102 may be maintained by an enterprise organization such as a financial institution, and may be configured to receive requests from one or more enterprise user devices (e.g., enterprise user device 106), which may each be linked to and/or otherwise associated with employees of the financial institution (e.g., requesting customer information, or the like).

Second cluster compaction and expansion storage platform 103 may be a computer system that includes one or more computing devices (e.g., servers, server blades, or the like) and/or other computer components (e.g., processors, memories, communication interfaces) that may be used to generate and maintain knowledge graphs and corresponding tables for query processing. In these instances, the second cluster compaction and expansion storage platform 103 may be configured to perform compaction and expansion of informational nodes stored at the second cluster compaction and expansion storage platform 103. Such informational nodes may correspond to, for example, customer information (e.g., address, account numbers, family members, or the like). In these instances, the second cluster compaction and expansion storage platform 103 may maintain information and/or data different from the information stored at the first cluster compaction and expansion storage platform 102 (e.g., based on social networks, geographic locations, or the like). In some instances, the second cluster compaction and expansion storage platform 103 may be maintained by an enterprise organization such as a financial institution, and may be configured to receive requests from one or more enterprise user devices (e.g., enterprise user device 106), which may each be linked to and/or otherwise associated with employees of the financial institution (e.g., requesting customer information, or the like).

Third cluster compaction and expansion storage platform 104 may be a computer system that includes one or more computing devices (e.g., servers, server blades, or the like) and/or other computer components (e.g., processors, memories, communication interfaces) that may be used to generate and maintain knowledge graphs and corresponding tables for query processing. In these instances, the third cluster compaction and expansion storage platform 104 may be configured to perform compaction and expansion of informational nodes stored at the third cluster compaction and expansion storage platform 104. Such informational nodes may correspond to, for example, customer information (e.g., address, account numbers, family members, or the like). In these instances, the third cluster compaction and expansion storage platform 104 may maintain information and/or data different from the information stored at the first cluster compaction and expansion storage platform 102, second cluster compaction and expansion storage platform 103, or the like (e.g., based on social networks, geographic locations, or the like). In some instances, the third cluster compaction and expansion storage platform 104 may be maintained by an enterprise organization such as a financial institution, and may be configured to receive requests from one or more enterprise user devices (e.g., enterprise user device 106), which may each be linked to and/or otherwise associated with employees of the financial institution (e.g., requesting customer information, or the like).

Fourth cluster compaction and expansion storage platform 105 may be a computer system that includes one or more computing devices (e.g., servers, server blades, or the like) and/or other computer components (e.g., processors, memories, communication interfaces) that may be used to generate and maintain knowledge graphs and corresponding tables for query processing. In these instances, the fourth cluster compaction and expansion storage platform 105 may be configured to perform compaction and expansion of informational nodes stored at the fourth cluster compaction and expansion storage platform 105. Such informational nodes may correspond to, for example, customer information (e.g., address, account numbers, family members, or the like). In these instances, the fourth cluster compaction and expansion storage platform 105 may maintain information and/or data different from the information stored at the first cluster compaction and expansion storage platform 102, the second cluster compaction and expansion storage platform 103, the third cluster compaction and expansion storage platform 104, or the like (e.g., based on social networks, geographic locations, or the like). In some instances, the fourth cluster compaction and expansion storage platform 105 may be maintained by an enterprise organization such as a financial institution, and may be configured to receive requests from one or more enterprise user devices (e.g., enterprise user device 106), which may each be linked to and/or otherwise associated with employees of the financial institution (e.g., requesting customer information, or the like).

Enterprise user device 106 may be a desktop computer, laptop computer, tablet, mobile device, or the like, and may be used by an individual such as an employee of the enterprise organization (e.g., a financial institution). For example, the enterprise user device 106 may request customer information, or the like in response to receiving user input. In addition, enterprise user device 106 may be configured to cause display of and/or otherwise present one or more graphical user interfaces (e.g., interfaces that indicate successful or failed attempts to process a requested event, or the like).

Central enterprise storage and routing device 107 may be one or more computing devices (e.g., servers, server blade, or the like) that may be configured to route data for storage at one of the cluster compaction and expansion storage platforms (e.g., first compaction and expansion storage platform 102, second compaction and expansion storage platform 103, third compaction and expansion storage platform 104, fourth compaction and expansion storage platform 105, or the like). In some instances, central enterprise storage and routing device 107 may also be configured to receive queries (e.g., from enterprise user devices such as enterprise user device 106) and route them to cluster compaction and expansion storage platforms (e.g., first compaction and expansion storage platform 102, second compaction and expansion storage platform 103, third compaction and expansion storage platform 104, fourth compaction and expansion storage platform 105, or the like) accordingly based on contents of the query. In some instances, the central enterprise storage and routing device 107 may also be configured to identify locations of data (e.g., specifying at which of the cluster compaction and expansion storage platforms is the particular data stored), and may provide this location information to another one of the cluster compaction and expansion storage platforms (e.g., so that it can access the other device to obtain particular data). For example, the central enterprise storage and routing device 107 may identify internet protocol addresses of the cluster compaction and expansion storage platforms at which each piece of data is stored, and may provide these internet protocol addresses to the various cluster compaction and expansion storage platforms.

Computing environment 100 also may include one or more networks, which may interconnect first cluster compaction and expansion storage platform 102, second cluster compaction and expansion storage platform 103, third cluster compaction and expansion storage platform 104, fourth cluster compaction and expansion storage platform 105, enterprise user device 106, and central enterprise storage and routing device 107. For example, computing environment 100 may include a network 101 (which may interconnect, e.g., first cluster compaction and expansion storage platform 102, second cluster compaction and expansion storage platform 103, third cluster compaction and expansion storage platform 104, fourth cluster compaction and expansion storage platform 105, enterprise user device 106, and central enterprise storage and routing device 107).

In one or more arrangements, first cluster compaction and expansion storage platform 102, second cluster compaction and expansion storage platform 103, third cluster compaction and expansion storage platform 104, fourth cluster compaction and expansion storage platform 105, enterprise user device 106, and central enterprise storage and routing device 107 may be any type of computing device capable of sending and/or receiving requests and processing the requests accordingly. For example, first cluster compaction and expansion storage platform 102, second cluster compaction and expansion storage platform 103, third cluster compaction and expansion storage platform 104, fourth cluster compaction and expansion storage platform 105, enterprise user device 106, central enterprise storage and routing device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of first cluster compaction and expansion storage platform 102, second cluster compaction and expansion storage platform 103, third cluster compaction and expansion storage platform 104, fourth cluster compaction and expansion storage platform 105, enterprise user device 106, and central enterprise storage and routing device 107 may, in some instances, be special-purpose computing devices configured to perform specific functions.

Referring to FIG. 1B, first cluster compaction and expansion storage platform 102 may include one or more processors 111, memory 112, and communication interface 113. A data bus may interconnect processor 111, memory 112, and communication interface 113. Communication interface 113 may be a network interface configured to support communication between first cluster compaction and expansion storage platform 102 and one or more networks (e.g., network 101, or the like). Memory 112 may include one or more program modules having instructions that when executed by processor 111 cause first cluster compaction and expansion storage platform 102 to perform one or more functions described herein and/or one or more databases that may store and/or otherwise maintain information which may be used by such program modules and/or processor 111. In some instances, the one or more program modules and/or databases may be stored by and/or maintained in different memory units of first cluster compaction and expansion storage platform 102 and/or by different computing devices that may form and/or otherwise make up first cluster compaction and expansion storage platform 102. For example, memory 112 may have, host, store, and/or include cluster compaction and expansion module 112a and cluster compaction and expansion database 112b. Cluster compaction and expansion module 112a may have instructions that direct and/or cause first cluster compaction and expansion storage platform 102 to execute advanced techniques related to data storage and query processing, as discussed in greater detail below. Cluster compaction and expansion database 112b may store information used by cluster compaction and expansion module 112a and/or first cluster compaction and expansion storage platform 102 in generating and maintaining knowledge graphs and their corresponding tables, and/or in performing other functions.

Figure 2B:
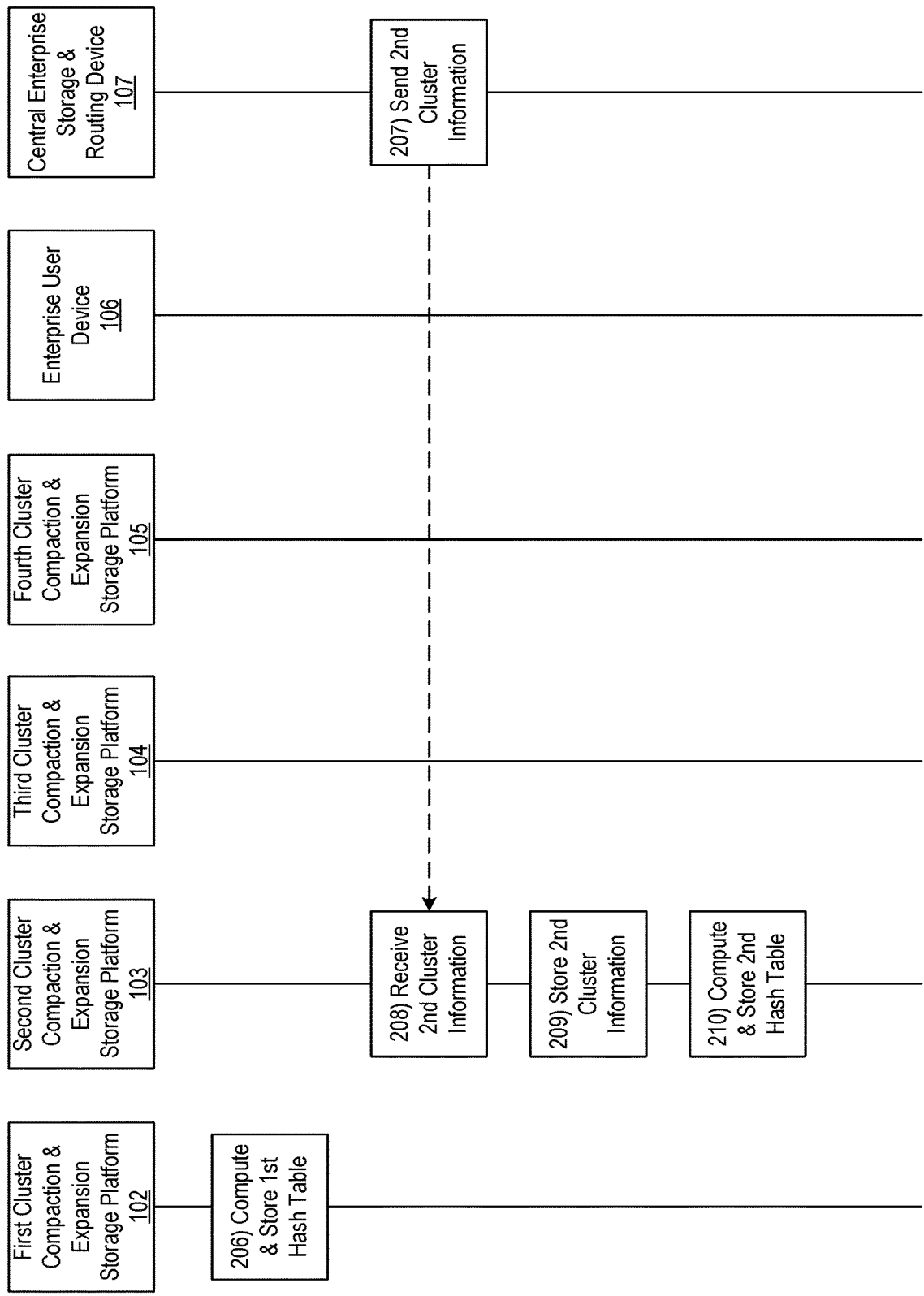

FIGS. 2A-2K depict an illustrative event sequence that implements dynamic cluster compaction and expansion for query processing in accordance with one or more example embodiments. Referring to FIG. 2A, at step 201, central enterprise storage and routing device 107 may receive information. In some instances, this information may be input by a user (e.g., an employee of an organization associated with the central enterprise storage and routing device 107). Additionally or alternatively, this information may be automatically determined based on, for example, previously stored data associated with the organization, a third party database, or the like. In some instances, in receiving the information, the central enterprise storage and routing device 107 may receive one or more of account information, natural language information, software information, social network information, or the like. In these instances, in receiving the information, the central enterprise storage and routing device 107 may receive information that may be represented as nodes within one or more knowledge graphs.

At step 202, the central enterprise storage and routing device 107 may identify natural clustering of the information, resulting in one or more abstracted information clusters. For example, the central enterprise storage and routing device 107 may identify one or more natural clusters based on, for example, geographic regions (e.g., a locality, jurisdiction, state, country, zip code, or the like), an associated organization (e.g., a financial institution, a school, a university, or the like), social networks (e.g., families, alumni networks, business networks, or the like), or the like. In some instances, the central enterprise storage and routing device 107 may determine one or more abstracted information clusters for each available cluster compaction and expansion storage platform (e.g., first cluster compaction and expansion storage platform 102, second cluster compaction and expansion storage platform 103, third cluster compaction and expansion storage platform 104, fourth cluster compaction and expansion storage platform 105, or the like).

At step 203, the central enterprise storage and routing device 107 may establish a connection with the first cluster compaction and expansion storage platform 102. In one or more instances, the central enterprise storage and routing device 107 may establish a first wireless data connection with the first cluster compaction and expansion storage platform 102 to link the central enterprise storage and routing device 107 to the first cluster compaction and expansion storage platform 102. In some instances, the central enterprise storage and routing device 107 may identify whether or not a connection is already established with the first cluster compaction and expansion storage platform 102. If a connection is already established with the first cluster compaction and expansion storage platform 102, the central enterprise storage and routing device 107 might not re-establish the connection. However, if a connection was not previously established with the first cluster compaction and expansion storage platform 102, the central enterprise storage and routing device 107 may establish the first wireless data connection as described herein.

The central enterprise storage and routing device 107 may select one or more of the abstracted information clusters, determined at step 202, and may send, share, or otherwise provide these one or more selected abstracted information clusters to the first cluster compaction and expansion storage platform 102. For purposes of the description, these one or more selected abstracted information clusters may be referred to as a first abstracted information cluster. In sending the first abstracted information cluster, the central enterprise storage and routing device 107 may send the first abstracted information cluster in its entirety (e.g., the first abstracted information cluster might not be split and sent, in part, to other compaction and expansion storage platforms). In some instances, in selecting the first cluster compaction and expansion storage platform 102 for the first abstracted information cluster, the central enterprise storage and routing device 107 may select the first cluster compaction and expansion storage platform 102 based on one or more of storage resources, data already stored at the first cluster compaction and expansion storage platform 102, or the like. In one or more instances, the central enterprise storage and routing device 107 may send the first abstracted information cluster to the first cluster compaction and expansion storage platform 102 while the first wireless data connection is established. In one or more instances, after routing the first abstracted information cluster to the first cluster compaction and expansion storage platform 102, the central enterprise storage and routing device 107 may maintain, in a stored table, location identifiers (e.g., an internet protocol address of the first cluster compaction and expansion storage platform 102), indicating where each piece of the information received at step 201 was sent for storage.

At step 204, the first cluster compaction and expansion storage platform 102 may receive or otherwise access the first abstracted information cluster sent at step 203. In one or more instances, the first cluster compaction and expansion storage platform 102 may receive one or more abstracted information clusters. In some instances, the first cluster compaction and expansion storage platform 102 may receive the first abstracted information cluster via the communication interface 113 and while the first wireless data connection is established.

At step 205, the first cluster compaction and expansion storage platform 102 may store the first abstracted information cluster as a C-node in a knowledge graph. In some instances, for each cluster received, the first cluster compaction and expansion storage platform 102 may generate and store a separate knowledge graph. In other instances, the first cluster compaction and expansion storage platform 102 may combine multiple received clusters into a single knowledge graph. In storing the first abstracted information cluster as the knowledge graph, the first cluster compaction and expansion storage platform 102 may store a plurality of nodes and edges, where the nodes each represent a piece of information and the edges connect the nodes and represent relationships between the connected nodes. An example knowledge graph is illustrated in FIG. 6, which is described above. In one or more instances, the first abstracted information cluster may be referred to herein as a C-Node. In storing the first abstracted information cluster as a C-node within the knowledge graph, the first cluster compaction and expansion storage platform 102 may perform compaction of the first abstracted information cluster.

Referring to FIG. 2B, at step 206, the first cluster compaction and expansion storage platform 102 may compute and store a first table containing the first abstracted information cluster and the corresponding adjacency information. In some instances, the first cluster compaction and expansion storage platform 102 may store, within the first table and along with the adjacency information, device identifiers (e.g., an internet protocol address, or the like) for each piece of the information received at the central enterprise storage and routing device 107 (e.g., which cluster compaction and expansion storage platform each piece of the information received at step 201 is stored at) and/or cluster identifiers for each piece of the information received at the central enterprise storage and routing device 107 (e.g., which cluster at each of the cluster compaction and expansion storage platforms each piece of the information received at step 201 is stored at).

In one or more instances, the first cluster compaction and expansion storage platform 102 may store only device and cluster identifiers for the first abstracted information cluster, and might not store device and cluster identifiers for the remaining received information, received at step 201 (e.g., the additional information that is stored at different cluster compaction and expansion storage platforms). In these instances, the first cluster compaction and expansion storage platform 102 may query the central enterprise storage and routing device 107 to identify a location of this remaining received information (e.g., a cluster compaction and expansion storage platform on which the remaining received information is stored). In these instances, the central enterprise storage and routing device 107 may maintain a locator table (which may, e.g., be a table) that stores correlations between the received information and storage locations of the received information (e.g., which cluster compaction and expansion storage platform is storing each piece of the received information). For example, the central enterprise storage and routing device 107 may identify internet protocol addresses of the cluster compaction and expansion storage platforms at which each piece of data is stored, and may provide these internet protocol addresses to the various cluster compaction and expansion storage platforms. Additionally or alternatively, the first cluster compaction and expansion storage platform 102 may access tables at other cluster compaction and expansion storage platforms to identify a location of the remaining received information. In some instances, in addition or as an alternative to the table, the first cluster compaction and expansion storage platform 102 may generate a link list, array, and/or other table to maintain the first abstracted information cluster.

At step 207, the central enterprise storage and routing device 107 may establish a connection with the second cluster compaction and expansion storage platform 103. In one or more instances, the central enterprise storage and routing device 107 may establish a second wireless data connection with the second cluster compaction and expansion storage platform 103 to link the central enterprise storage and routing device 107 to the second cluster compaction and expansion storage platform 103. In some instances, the central enterprise storage and routing device 107 may identify whether or not a connection is already established with the second cluster compaction and expansion storage platform 103. If a connection is already established with the second cluster compaction and expansion storage platform 103, the central enterprise storage and routing device 107 might not re-establish the connection. However, if a connection was not previously established with the second cluster compaction and expansion storage platform 103, the central enterprise storage and routing device 107 may establish the second wireless data connection as described herein.

The central enterprise storage and routing device 107 may select one or more of the abstracted information clusters, determined at step 202, and may send, share, or otherwise provide these one or more selected abstracted information clusters to the second cluster compaction and expansion storage platform 103. For purposes of the description, these one or more selected abstracted information clusters may be referred to as a second abstracted information cluster. In sending the second abstracted information cluster, the central enterprise storage and routing device 107 may send the second abstracted information cluster in its entirety (e.g., the second abstracted information cluster might not be split and sent, in part, to other compaction and expansion storage platforms). In some instances, in selecting the second cluster compaction and expansion storage platform 103 for the second abstracted information cluster, the central enterprise storage and routing device 107 may select the second cluster compaction and expansion storage platform 103 based on one or more of storage resources, data already stored at the second cluster compaction and expansion storage platform 103, or the like. In one or more instances, the central enterprise storage and routing device 107 may send the second abstracted information cluster to the second cluster compaction and expansion storage platform 103 while the second wireless data connection is established. In one or more instances, after routing the second abstracted information cluster to the second cluster compaction and expansion storage platform 103, the central enterprise storage and routing device 107 may maintain, in a stored table, location identifiers (e.g., an internet protocol address of the second cluster compaction and expansion storage platform 103), indicating where each piece of the information received at step 201 was sent for storage. Actions performed by the central enterprise storage and routing device 107 at step 207 may be similar to those described above at step 203.

At step 208, the second cluster compaction and expansion storage platform 103 may receive or otherwise access the second abstracted information cluster sent at step 207. In one or more instances, the second cluster compaction and expansion storage platform 103 may receive one or more abstracted information clusters. In some instances, the second cluster compaction and expansion storage platform 103 may receive the second abstracted information cluster via a communication interface of the second cluster compaction and expansion storage platform 103 and while the second wireless data connection is established. Actions performed by the second cluster compaction and expansion storage platform 103 at step 208 may be similar to those described above at step 204 with regard to the first cluster compaction and expansion storage platform 102.

At step 209, the second cluster compaction and expansion storage platform 103 may store the second abstracted information cluster as a C-node of the knowledge graph. In some instances, for each cluster received, the second cluster compaction and expansion storage platform 103 may generate and store a separate knowledge graph. In other instances, the second cluster compaction and expansion storage platform 103 may combine multiple received clusters into a single knowledge graph. In storing the second abstracted information cluster as the knowledge graph, the second cluster compaction and expansion storage platform 103 may store a plurality of nodes and edges, where the nodes each represent a piece of information and the edges connect the nodes and represent relationships between the connected nodes. An example knowledge graph is illustrated in FIG. 6, which is described above. In one or more instances, the second abstracted information cluster may be referred to herein as a C-Node. In storing the second abstracted information cluster as a C-node within the knowledge graph, the second cluster compaction and expansion storage platform 103 may perform compaction of the second abstracted information cluster. Actions performed at step 209 may be similar to those described above at step 205 with regard to the first cluster compaction and expansion storage platform 102.

At step 210, the second cluster compaction and expansion storage platform 103 may compute and store a second table containing the second abstracted information cluster and the corresponding adjacency information. In some instances, the second cluster compaction and expansion storage platform 103 may store, within the second table and along with the adjacency information, device identifiers (e.g., internet protocol addresses, or the like) for each piece of the information received at the central enterprise storage and routing device 107 (e.g., which cluster compaction and expansion storage platform each piece of the information received at step 201 is stored at) and/or cluster identifiers for each piece of the information received at the central enterprise storage and routing device 107 (e.g., which cluster at each of the cluster compaction and expansion storage platforms each piece of the information received at step 201 is stored at).

In one or more instances, the second cluster compaction and expansion storage platform 103 may store only device and cluster identifiers for the second abstracted information cluster, and might not store device and cluster identifiers for the remaining received information, received at step 201 (e.g., the additional information that is stored at different cluster compaction and expansion storage platforms, such as information stored at the first cluster compaction and expansion storage platform 102). In these instances, the second cluster compaction and expansion storage platform 103 may query the central enterprise storage and routing device 107 to identify a location of this remaining received information (e.g., a cluster compaction and expansion storage platform on which the remaining received information is stored). In these instances, the central enterprise storage and routing device 107 may maintain a locator table (which may, e.g., be a table) that stores correlations between the received information and storage locations of the received information (e.g., which cluster compaction and expansion storage platform is storing each piece of the received information). For example, the central enterprise storage and routing device 107 may identify internet protocol addresses of the cluster compaction and expansion storage platforms at which each piece of data is stored, and may provide these internet protocol addresses to the various cluster compaction and expansion storage platforms. Additionally or alternatively, the second cluster compaction and expansion storage platform 103 may access tables at other cluster compaction and expansion storage platforms (e.g., the first table at the first cluster compaction and expansion storage platform 102) to identify a location of the remaining received information. In some instances, in addition or as an alternative to the table, the first cluster compaction and expansion storage platform 102 may generate a link list, array, and/or other table to maintain the first abstracted information cluster. Actions performed at step 210 may be similar to those described above with regard to the first cluster compaction and expansion storage platform 102 at step 206.

Figure 2C:
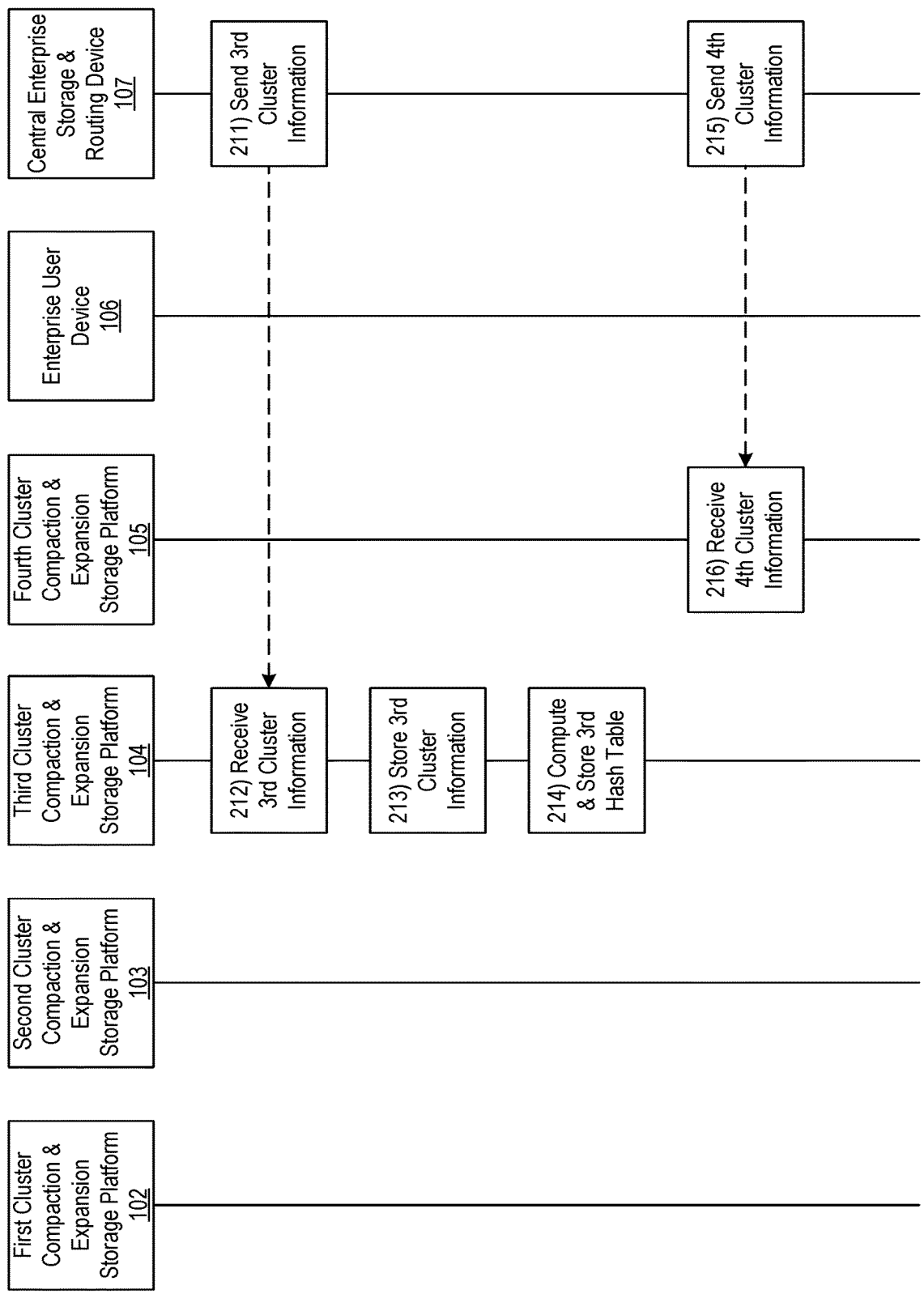

Referring to FIG. 2C, at step 211, the central enterprise storage and routing device 107 may establish a connection with the third cluster compaction and expansion storage platform 104. In one or more instances, the central enterprise storage and routing device 107 may establish a third wireless data connection with the third cluster compaction and expansion storage platform 104 to link the central enterprise storage and routing device 107 to the third cluster compaction and expansion storage platform 104. In some instances, the central enterprise storage and routing device 107 may identify whether or not a connection is already established with the third cluster compaction and expansion storage platform 104. If a connection is already established with the third cluster compaction and expansion storage platform 104, the central enterprise storage and routing device 107 might not re-establish the connection. However, if a connection was not previously established with the third cluster compaction and expansion storage platform 104, the central enterprise storage and routing device 107 may establish the third wireless data connection as described herein.

The central enterprise storage and routing device 107 may select one or more of the abstracted information clusters, determined at step 202, and may send, share, or otherwise provide these one or more selected abstracted information clusters to the third cluster compaction and expansion storage platform 104. For purposes of the description, these one or more selected abstracted information clusters may be referred to as a third abstracted information cluster. In sending the third abstracted information cluster, the central enterprise storage and routing device 107 may send the third abstracted information cluster in its entirety (e.g., the third abstracted information cluster might not be split and sent, in part, to other compaction and expansion storage platforms). In some instances, in selecting the third cluster compaction and expansion storage platform 104 for the third abstracted information cluster, the central enterprise storage and routing device 107 may select the third cluster compaction and expansion storage platform 104 based on one or more of storage resources, data already stored at the third cluster compaction and expansion storage platform 104, or the like. In one or more instances, the central enterprise storage and routing device 107 may send the third abstracted information cluster to the third cluster compaction and expansion storage platform 104 while the third wireless data connection is established. In one or more instances, after routing the third abstracted information cluster to the third cluster compaction and expansion storage platform 104, the central enterprise storage and routing device 107 may maintain, in a stored table, location identifiers (e.g., an internet protocol address of the third cluster compaction and expansion storage platform 102), indicating where each piece of the information received at step 201 was sent for storage. Actions performed by the central enterprise storage and routing device 107 at step 211 may be similar to those described above at steps 203 and 207.

At step 212, the third cluster compaction and expansion storage platform 104 may receive or otherwise access the third abstracted information cluster sent at step 211. In one or more instances, the third cluster compaction and expansion storage platform 104 may receive one or more abstracted information clusters. In some instances, the third cluster compaction and expansion storage platform 104 may receive the third abstracted information cluster via a communication interface of the third cluster compaction and expansion storage platform 104 and while the third wireless data connection is established. Actions performed by the third cluster compaction and expansion storage platform 104 at step 212 may be similar to those described above at step 204 with regard to the first cluster compaction and expansion storage platform 102 and step 208 with regard to the second cluster compaction and expansion storage platform 103.

At step 213, the third cluster compaction and expansion storage platform 104 may store the third abstracted information cluster as a C-node of the knowledge graph. In some instances, for each cluster received, the third cluster compaction and expansion storage platform 104 may generate and store a separate knowledge graph. In other instances, the third cluster compaction and expansion storage platform 104 may combine multiple received clusters into a single knowledge graph. In storing the third abstracted information cluster as the knowledge graph, the third cluster compaction and expansion storage platform 104 may store a plurality of nodes and edges, where the nodes each represent a piece of information and the edges connect the nodes and represent relationships between the connected nodes. An example knowledge graph is illustrated in FIG. 6, which is described further above. In one or more instances, the third abstracted information cluster may be referred to herein as a C-Node. In storing the third abstracted information cluster as a C-node within the knowledge graph, the third cluster compaction and expansion storage platform 104 may perform compaction of the third abstracted information cluster. Actions performed at step 213 may be similar to those described above at step 205 with regard to the first cluster compaction and expansion storage platform 102 and step 209 with regard to the second cluster compaction and expansion storage platform 103.

At step 214, the third cluster compaction and expansion storage platform 104 may compute and store a third table containing the third abstracted information cluster and the corresponding adjacency information. In some instances, the third cluster compaction and expansion storage platform 104 may store, within the third table and along with the adjacency information, device identifiers (e.g., internet protocol addresses, or the like) for each piece of the information received at the central enterprise storage and routing device 107 (e.g., which cluster compaction and expansion storage platform each piece of the information received at step 201 is stored at) and/or cluster identifiers for each piece of the information received at the central enterprise storage and routing device 107 (e.g., which cluster at each of the cluster compaction and expansion storage platforms each piece of the information received at step 201 is stored at).

In one or more instances, the third cluster compaction and expansion storage platform 104 may store only device and cluster identifiers for the third abstracted information cluster, and might not store device and cluster identifiers for the remaining received information, received at step 201 (e.g., the additional information that is stored at other cluster compaction and expansion storage platforms, such as information stored at the first cluster compaction and expansion storage platform 102 and/or stored at the second cluster compaction and expansion storage platform 103). In these instances, the third cluster compaction and expansion storage platform 104 may query the central enterprise storage and routing device 107 to identify a location of this remaining received information (e.g., a cluster compaction and expansion storage platform on which the remaining received information is stored). In these instances, the central enterprise storage and routing device 107 may maintain a locator table (which may, e.g., be a table) that stores correlations between the received information and storage locations of the received information (e.g., which cluster compaction and expansion storage platform is storing each piece of the received information). For example, the central enterprise storage and routing device 107 may identify internet protocol addresses of the cluster compaction and expansion storage platforms at which each piece of data is stored, and may provide these internet protocol addresses to the various cluster compaction and expansion storage platforms. Additionally or alternatively, the third cluster compaction and expansion storage platform 104 may access tables at other cluster compaction and expansion storage platforms (e.g., the first table at the first cluster compaction and expansion storage platform 102, the second table at the second cluster compaction and expansion storage platform 103, or the like) to identify a location of the remaining received information. In some instances, in addition or as an alternative to the table, the first cluster compaction and expansion storage platform 102 may generate a link list, array, and/or other table to maintain the first abstracted information cluster.

At step 215, the central enterprise storage and routing device 107 may establish a connection with the fourth cluster compaction and expansion storage platform 105. In one or more instances, the central enterprise storage and routing device 107 may establish a third wireless data connection with the fourth cluster compaction and expansion storage platform 105 to link the central enterprise storage and routing device 107 to the fourth cluster compaction and expansion storage platform 105. In some instances, the central enterprise storage and routing device 107 may identify whether or not a connection is already established with the fourth cluster compaction and expansion storage platform 105. If a connection is already established with the fourth cluster compaction and expansion storage platform 105, the central enterprise storage and routing device 107 might not re-establish the connection. However, if a connection was not previously established with the fourth cluster compaction and expansion storage platform 105, the central enterprise storage and routing device 107 may establish the fourth wireless data connection as described herein.

The central enterprise storage and routing device 107 may select one or more of the abstracted information clusters, determined at step 202, and may send, share, or otherwise provide these one or more selected abstracted information clusters to the fourth cluster compaction and expansion storage platform 105. For purposes of the description, these one or more selected abstracted information clusters may be referred to as a fourth abstracted information cluster. In sending the fourth abstracted information cluster, the central enterprise storage and routing device 107 may send the fourth abstracted information cluster in its entirety (e.g., the fourth abstracted information cluster might not be split and sent, in part, to other compaction and expansion storage platforms). In some instances, in selecting the fourth cluster compaction and expansion storage platform 105 for the fourth abstracted information cluster, the central enterprise storage and routing device 107 may select the fourth cluster compaction and expansion storage platform 105 based on one or more of storage resources, data already stored at the fourth cluster compaction and expansion storage platform 105, or the like. In one or more instances, the central enterprise storage and routing device 107 may send the fourth abstracted information cluster to the fourth cluster compaction and expansion storage platform 105 while the fourth wireless data connection is established. In one or more instances, after routing the fourth abstracted information cluster to the fourth cluster compaction and expansion storage platform 105, the central enterprise storage and routing device 107 may maintain, in a stored table, location identifiers (e.g., an internet protocol address of the fourth cluster compaction and expansion storage platform 105), indicating where each piece of the information received at step 201 was sent for storage. Actions performed by the central enterprise storage and routing device 107 at step 215 may be similar to those described above at steps 203, 207, and 211.

At step 216, the fourth cluster compaction and expansion storage platform 105 may receive or otherwise access the fourth abstracted information cluster sent at step 215. In one or more instances, the fourth cluster compaction and expansion storage platform 105 may receive one or more abstracted information clusters. In some instances, the fourth cluster compaction and expansion storage platform 105 may receive the fourth abstracted information cluster via a communication interface of the fourth cluster compaction and expansion storage platform 105 and while the fourth wireless data connection is established. Actions performed by the fourth cluster compaction and expansion storage platform 105 at step 216 may be similar to those described above at step 204 with regard to the first cluster compaction and expansion storage platform 102, step 208 with regard to the second cluster compaction and expansion storage platform 103, and/or step 212 with regard to the third cluster compaction and expansion storage platform 104.

Figure 2D:
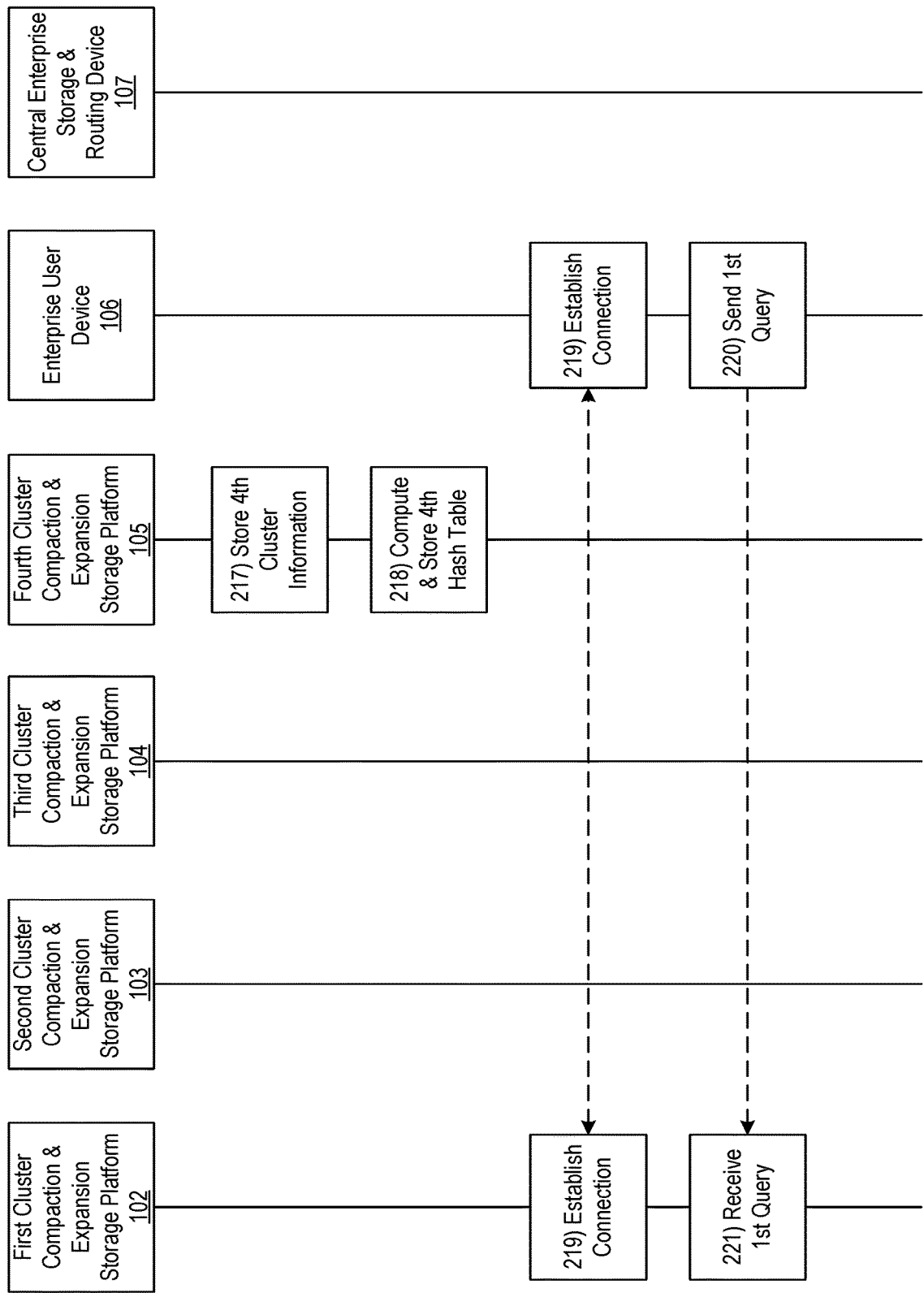

Referring to FIG. 2D, at step 217, the fourth cluster compaction and expansion storage platform 105 may store the fourth abstracted information cluster as a C-node of the knowledge graph. In some instances, for each cluster received, the fourth cluster compaction and expansion storage platform 105 may generate and store a separate knowledge graph. In other instances, the fourth cluster compaction and expansion storage platform 105 may combine multiple received clusters into a single knowledge graph. In storing the fourth abstracted information cluster as the knowledge graph, the fourth cluster compaction and expansion storage platform 105 may store a plurality of nodes and edges, where the nodes each represent a piece of information and the edges connect the nodes and represent relationships between the connected nodes. An example knowledge graph is illustrated in FIG. 6, which is described further above. In one or more instances, the fourth abstracted information cluster may be referred to herein as a C-Node. In storing the fourth abstracted information cluster as a C-node within the knowledge graph, the fourth cluster compaction and expansion storage platform 102 may perform compaction of the fourth abstracted information cluster. Actions performed at step 217 may be similar to those described above at step 205 with regard to the first cluster compaction and expansion storage platform 102, step 209 with regard to the second cluster compaction and expansion storage platform 103, and/or step 213 with regard to the third cluster compaction and expansion storage platform 104.

At step 218, the fourth cluster compaction and expansion storage platform 105 may compute and store a fourth table containing the fourth abstracted information cluster and the corresponding adjacency information. In some instances, the fourth cluster compaction and expansion storage platform 105 may store, within the fourth table and along with the adjacency information, device identifiers (e.g., internet protocols, or the like) for each piece of the information received at the central enterprise storage and routing device 107 (e.g., which cluster compaction and expansion storage platform each piece of the information received at step 201 is stored at) and/or cluster identifiers for each piece of the information received at the central enterprise storage and routing device 107 (e.g., which cluster at each of the cluster compaction and expansion storage platforms each piece of the information received at step 201 is stored at).

In one or more instances, the fourth cluster compaction and expansion storage platform 105 may store only device and cluster identifiers for the fourth abstracted information cluster, and might not store device and cluster identifiers for the remaining received information, received at step 201 (e.g., the additional information that is stored at other cluster compaction and expansion storage platforms, such as information stored at the first cluster compaction and expansion storage platform 102, at the second cluster compaction and expansion storage platform 103, and/or at the third cluster compaction and expansion storage platform 104). In these instances, the fourth cluster compaction and expansion storage platform 105 may query the central enterprise storage and routing device 107 to identify a location of this remaining received information (e.g., a cluster compaction and expansion storage platform on which the remaining received information is stored). In these instances, the central enterprise storage and routing device 107 may maintain a locator table (which may, e.g., be a table) that stores correlations between the received information and storage locations of the received information (e.g., which cluster compaction and expansion storage platform is storing each piece of the received information). For example, the central enterprise storage and routing device 107 may identify internet protocol addresses of the cluster compaction and expansion storage platforms at which each piece of data is stored, and may provide these internet protocol addresses to the various cluster compaction and expansion storage platforms. Additionally or alternatively, the fourth cluster compaction and expansion storage platform 105 may access tables at other cluster compaction and expansion storage platforms (e.g., the first table at the first cluster compaction and expansion storage platform 102, the second table at the second cluster compaction and expansion storage platform 103, the third table at the third cluster compaction and expansion storage platform 104, or the like) to identify a location of the remaining received information. In some instances, in addition or as an alternative to the table, the first cluster compaction and expansion storage platform 102 may generate a link list, array, and/or other table to maintain the first abstracted information cluster. Actions performed at step 217 may be similar to those described above with regard to the first cluster compaction and expansion storage platform 102 at step 206, the second cluster compaction and expansion storage platform 103 at step 210, the third cluster compaction and expansion storage platform 104 at step 214, or the like.

Accordingly, by distributing these various clusters to the different cluster compaction and expansion storage platforms and computing the various tables as described above at steps 201-218, the central enterprise storage and routing device 107 and the various cluster compaction and expansion storage platforms may store information in a distributed environment to achieve the technical advantages of knowledge graph implementations (e.g., network security advantages, convenient capture of data relationships, or the like), while conserving storage resources and minimizing the inherent inefficiency of retrieving information across the distributed environment and the network latency. In creating a distributed data environment in this way, a knowledge graph as illustrated in FIG. 9 (which is described further above), may be generated.

At step 219, enterprise user device 106 may establish a connection with the first cluster compaction and expansion storage platform 102. In some instances, the enterprise user device 106 may establish a fifth wireless data connection with the first cluster compaction and expansion storage platform 102 to link the enterprise user device 106 to the first cluster compaction and expansion storage platform 102. In some instances, the enterprise user device 106 may identify whether or not a connection was previously established with the first cluster compaction and expansion storage platform 102. If a connection was previously established, the enterprise user device 106 might not re-establish the fifth wireless data connection. If a connection was not previously established, the enterprise user device 106 may establish the fifth wireless data connection as described herein.

At step 220, the enterprise user device 106 may generate and send a first query to the first cluster compaction and expansion storage platform 102. In some instances, the enterprise user device 106 may send the first query to the first cluster compaction and expansion storage platform 102 while the fifth wireless data connection is established. In some instances, the enterprise user device 106 may generate the first query based on user input received from a user of the enterprise user device 106 (e.g., an employee of a financial institution, or the like). For example, in generating the first query, the enterprise user device 106 may generate a query requesting account information (e.g., account numbers, routing numbers, individuals associated with the account, account balance, related accounts, personal information associated with account holders, or the like), natural language processing information (e.g., sentence structures, relations between subjects and verbs, relations between predicates and verbs, common spellings of a particular word, or the like), software information (e.g., software components, relations between software components, software processes, inputs to software components, outputs to software components, or the like), personal connections (friends, family, members of a common social network, e.g., connected through a mutual organization such as a company, school, or the like, or the like. In instances in which personal information and/or connections are requested for an individual, that individual may have previously consented to the availability of such information (e.g., by providing input at a client device corresponding to acceptance of terms, or the like). Additionally or alternatively, in these instances, the individual may provide a form of consent to a user of the enterprise user device 106, and the user of the enterprise user device 106 may input an indication of the consent.

In some instances, rather than sending the first query to the first cluster compaction and expansion storage platform 102, the enterprise user device 106 may send the first query to the central enterprise storage and routing device 107. In these instances, the central enterprise storage and routing device 107 may identify requested information in the first query, and route the first query to a cluster compaction and expansion storage platform accordingly (e.g., by accessing a stored database, table, or the like that maintains location identifiers (e.g., internet protocol addresses of the cluster compaction and expansion storage platforms, or the like) for various pieces of information).

As a particular example, in sending the first query, the enterprise user device 106 may send a query requesting account numbers associated with a spouse of an individual (e.g., Person #1). This example may be described further throughout steps 221-227 for purposes of illustrating one or more of the methods described herein.

At step 221, the first cluster compaction and expansion storage platform 102 may receive the first query from the enterprise user device 106. For example, the first cluster compaction and expansion storage platform 102 may receive the first query via the communication interface 113 and while the fifth wireless data connection is established. As a particular example, in receiving the first query, the first cluster compaction and expansion storage platform 102 may receive a request for account numbers of Person #1's spouse, as described above with regard to step 220.

Figure 2E:
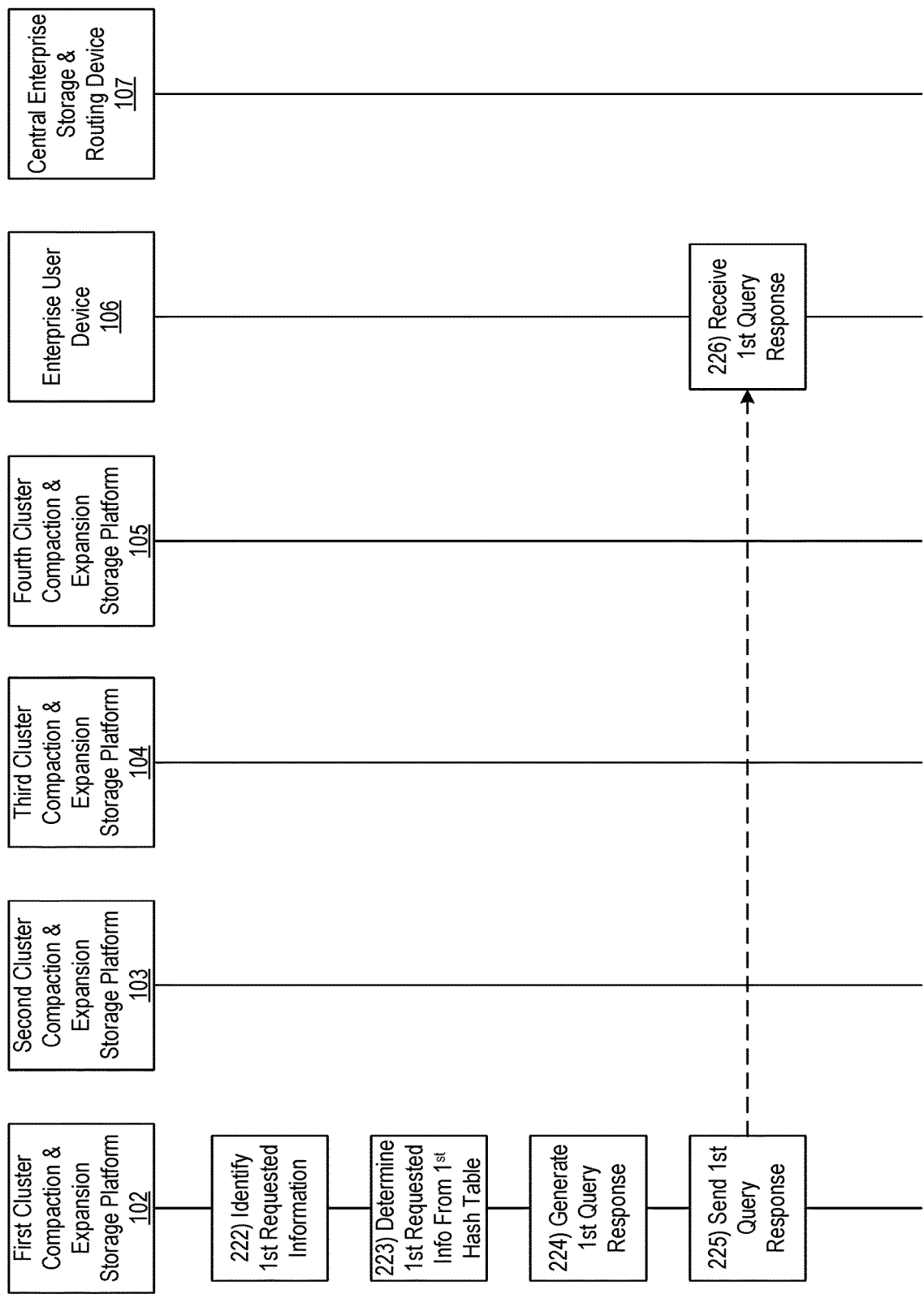

Referring to FIG. 2E, at step 222, the first cluster compaction and expansion storage platform 102 may identify first request information using the first query. For example, the first cluster compaction and expansion storage platform 102 may parse the first query to identify what information is being requested. As a particular example, the first cluster compaction and expansion storage platform 102 may parse the first query to determine that an identity of the spouse of Person #1 is being requested. Furthermore, in parsing the first query, the first cluster compaction and expansion storage platform 102 may determine that account numbers associated with the spouse of Person #1 are being requested.

At step 223, the first cluster compaction and expansion storage platform 102 may identify the first request information using the first table. In one or more instances, in identifying the first request information, the first cluster compaction and expansion storage platform 102 may determine that the first table contains all of the first request information (e.g., that all of the first request information is locally stored and no part of the first request information is stored at other cluster compaction and expansion storage platforms). In one or more instances, to obtain the first request information, the first cluster compaction and expansion storage platform 102 may expand the C-Node corresponding to the first abstracted information cluster. This expansion is shown, for example, in FIG. 10, which is described further above. Accordingly, in these instances, the first cluster compaction and expansion storage platform 102 may expand the first abstracted information cluster.

To continue with the particular example described above, the first cluster compaction and expansion storage platform 102 may identify, using the first table, an identity of the spouse of Person #1. For example, the first cluster compaction and expansion storage platform 102 may access a column or row of the first table associated with Person #1 (e.g., the header of the column or row may be "Person #1"), and may search within that column of row for a data value corresponding to "is married to," or some other similar language indicating a spousal relationship. In this example, once the first cluster compaction and expansion storage platform 102 identifies the data value corresponding to "is married to," the first cluster compaction and expansion storage platform 102 may identify, in the case that the column is associated with Person #1, an individual associated with a row in the first table that intersects with the Person #1 column at the "is married to" data value (e.g., the header of the row may be Person #2). In the case that the row is associated with Person #1, the first cluster compaction and expansion storage platform 102 may identify an individual associated with a column in the first table that intersects with the Person #1 row at the "is married to" data value (e.g., the header of the column may be Person #2). In doing so, the first cluster compaction and expansion storage platform 102 may identify a spouse of Person #1, who may be named, for example, Person #2.

Once an identity of Person #2 has been determined by the first cluster compaction and expansion storage platform 102, the first cluster compaction and expansion storage platform 102 may use a similar method to identify account numbers associated with Person #2. For example, the first cluster compaction and expansion storage platform 102 may identify a column of the first table associated with Person #2, and may identify corresponding rows (which may each have an account number as their header) that intersect with the Person #2 column at data values of "has an account number of," or some other similar language indicating a relationship between the account number and Person #2. For example, the first cluster compaction and expansion storage platform 102 may identify that Person #2 maintains "Account #1," "Account #2," and "Account #3."

At step 224, the first cluster compaction and expansion storage platform 102 may generate a first query response using the first table. For example, the first cluster compaction and expansion storage platform 102 may generate a first query response indicating the spouse of Person #1 is Person #2, and that Person #2 maintains Account #1, Account #2, and Account #3.

At step 225, the first cluster compaction and expansion storage platform 102 may send the first query response, generated at step 224, to the enterprise user device 106. In one or more instances, the first cluster compaction and expansion storage platform 102 may send the first query response to the enterprise user device 106 via the communication interface 113 and while the fifth wireless data connection is established. In one or more instances, the first cluster compaction and expansion storage platform 102 may generate and send, along with the first query response, one or more commands directing the enterprise user device 106 to display a first query response interface based on the first query response.

At step 226, the enterprise user device 106 may receive the first query response from the first cluster compaction and expansion storage platform 102. In one or more instances, the enterprise user device 106 may receive the first query response from the first cluster compaction and expansion storage platform 102 while the fifth wireless data connection is established. In some instances, the enterprise user device 106 may also receive the one or more commands directing the enterprise user device 106 to display a first query response interface based on the first query response.

Figure 2F:
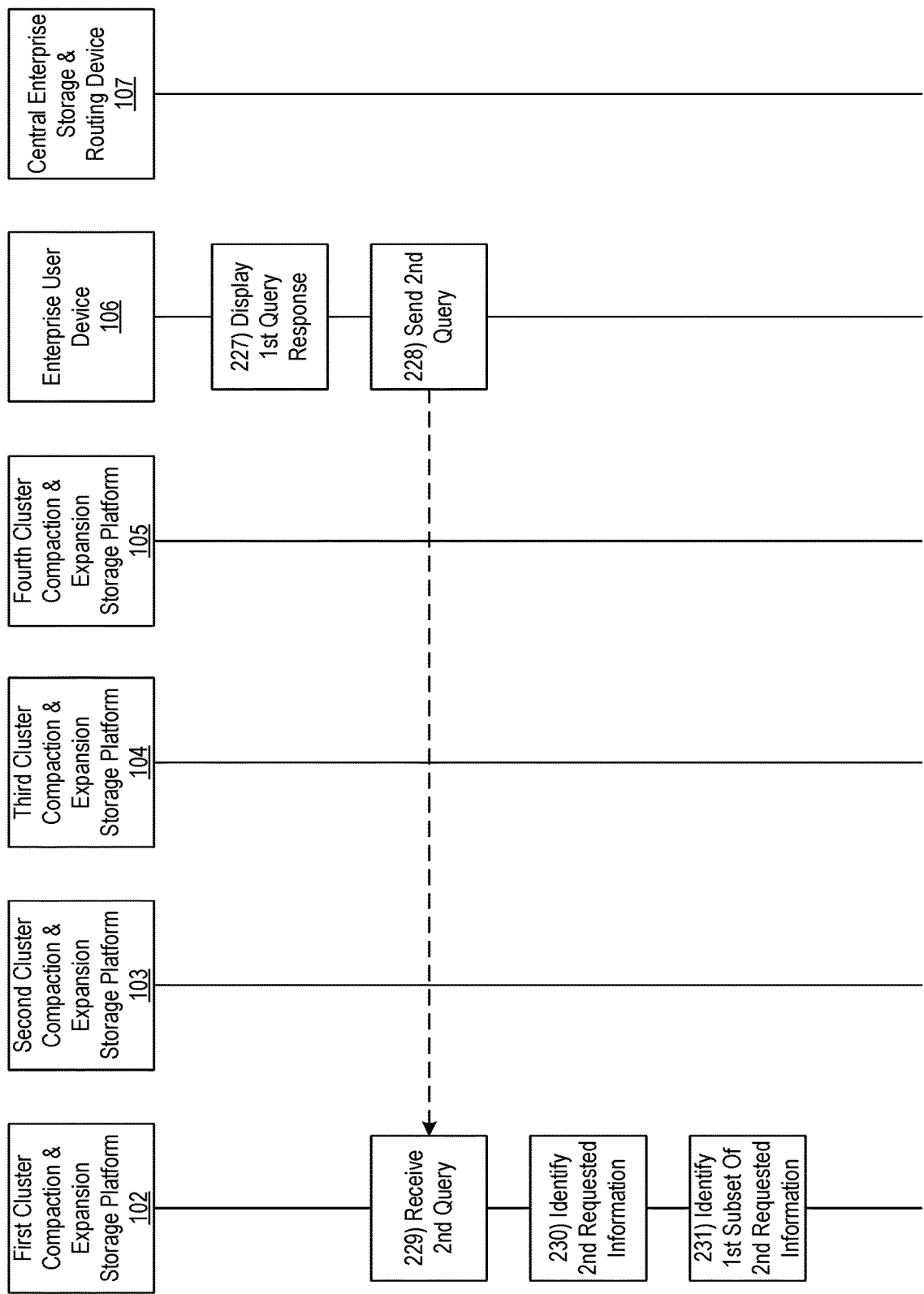

Referring to FIG. 2F, at step 227, the enterprise user device 106 may generate and display a first query response interface based on the first query response. In some instances, the enterprise user device 106 may generate and display the first query response interface in response to the one or more commands directing the enterprise user device 106 to display the first query response interface based on the first query response. In some instances, in displaying the first query response interface, the enterprise user device 106 may display a graphical user interface similar to graphical user interface 305, which is shown in FIG. 3. For example, the enterprise user device 106 may display an interface indicating a plurality of accounts associated with an individual's spouse, as described in the example of steps 220-226.

At step 228, the enterprise user device 106 may generate and send a second query to the first cluster compaction and expansion storage platform 102. In some instances, the enterprise user device 106 may send the second query to the first cluster compaction and expansion storage platform 102 while the fifth wireless data connection is established. In some instances, the enterprise user device 106 may generate the second query based on user input received from a user of the enterprise user device 106 (e.g., an employee of a financial institution, or the like). For example, in generating the second query, the enterprise user device 106 may generate a query requesting account information (e.g., account numbers, routing numbers, individuals associated with the account, account balance, related accounts, personal information associated with account holders, or the like), natural language processing information (e.g., sentence structures, relations between subjects and verbs, relations between predicates and verbs, common spellings of a particular word, or the like), software information (e.g., software components, relations between software components, software processes, inputs to software components, outputs to software components, or the like), personal connections (friends, family, members of a common social network (e.g., connected through a mutual organization such as a company, school, or the like), or the like. In instances in which personal information and/or connections are requested for an individual, that individual may have previously consented to the availability of such information (e.g., by providing input at a client device corresponding to acceptance of terms, or the like). Additionally or alternatively, in these instances, the individual may provide a form of consent to a user of the enterprise user device 106, and the user of the enterprise user device 106 may input an indication of the consent.

In some instances, rather than sending the second query to the first cluster compaction and expansion storage platform 102, the enterprise user device 106 may send the second query to the central enterprise storage and routing device 107. In these instances, the central enterprise storage and routing device 107 may identify requested information in the second query, and route the second query to a cluster compaction and expansion storage platform accordingly (e.g., by accessing a stored database, table, or the like that maintains location identifiers (e.g., internet protocol addresses of the cluster compaction and expansion storage platforms, or the like) for various pieces of information).

As a particular example, in sending the second query, the enterprise user device 106 may send a query requesting addresses associated with an individual (e.g., Person #1). This example may be described further throughout steps 221-244 for purposes of illustrating one or more of the methods described herein. Actions performed at step 228 may be similar to those described above with regard to step 220.

At step 229, the first cluster compaction and expansion storage platform 102 may receive the second query from the enterprise user device 106. For example, the first cluster compaction and expansion storage platform 102 may receive the second query via the communication interface 113 and while the fifth wireless data connection is established. As a particular example, in receiving the first query, the first cluster compaction and expansion storage platform 102 may receive a request for addresses associated with Person #1, as described above with regard to step 228. Actions performed at step 229 may be similar to those described above with regard to step 221.

At step 230, the first cluster compaction and expansion storage platform 102 may identify second request information using the second query. For example, the first cluster compaction and expansion storage platform 102 may parse the second query to identify what information is being requested. As a particular example, the first cluster compaction and expansion storage platform 102 may parse the second query to determine that addresses of Person #1 are being requested. Actions performed at step 230 may be similar to those described above with regard to step 222.

At step 231, the first cluster compaction and expansion storage platform 102 may identify a first subset of the second request information using the first table. In one or more instances, in identifying the first subset of the second request information, the first cluster compaction and expansion storage platform 102 may determine that, in contrast to step 223, the first table does not contain all of the second request information (e.g., that not all of the second request information is locally stored and that some part of the second request information is stored at other cluster compaction and expansion storage platforms). In one or more instances, to obtain the first subset of the second request information, the first cluster compaction and expansion storage platform 102 may expand the C-Node corresponding to the first abstracted information cluster. This expansion is shown, for example, in FIG. 10, which is described further above. Accordingly, in these instances, the first cluster compaction and expansion storage platform 102 may expand the first abstracted information cluster.

To continue with the particular example described above, the first cluster compaction and expansion storage platform 102 may identify, using the first table, an address of Person #1. For example, the first cluster compaction and expansion storage platform 102 may access a column or row of the first table associated with Person #1 (e.g., the header of the column or row may be "Person #1"), and may search within that column of row for a data value corresponding to "lives at," or some other similar language indicating residence information. In this example, once the first cluster compaction and expansion storage platform 102 identifies the data value corresponding to "lives at," the first cluster compaction and expansion storage platform 102 may identify, in the case that the column is associated with Person #1, an address associated with a row in the first table that intersects with the Person #1 column at the "lives at" data value (e.g., the header of the row may be Address #1). In the case that the row is associated with Person #1, the first cluster compaction and expansion storage platform 102 may identify an address associated with a column in the first table that intersects with the Person #1 row at the "lives at" data value (e.g., the header of the column may be Address #1). In doing so, the first cluster compaction and expansion storage platform 102 may identify a first address of Person #1, such as Address #1.

For example, each of the cluster compaction and expansion storage platforms may be configured to store residential information associated with a particular geographic region (e.g., zip code, city, state, country, county, or the like). In this example, Person #1 may have a first address in a first geographic region (e.g., Address #1) for which information is stored at the first cluster compaction and expansion storage platform 102. However, Person #1 may also have additional addresses, in other geographic regions, for which information is not stored locally at the first cluster compaction and expansion storage platform 102. Actions performed at step 231 may be similar to those described above with regard to those described above with regard to step 223; however, at step 231, in contrast to step 223, the first cluster compaction and expansion storage platform might not identify all information requested in the received query.

Figure 2G:
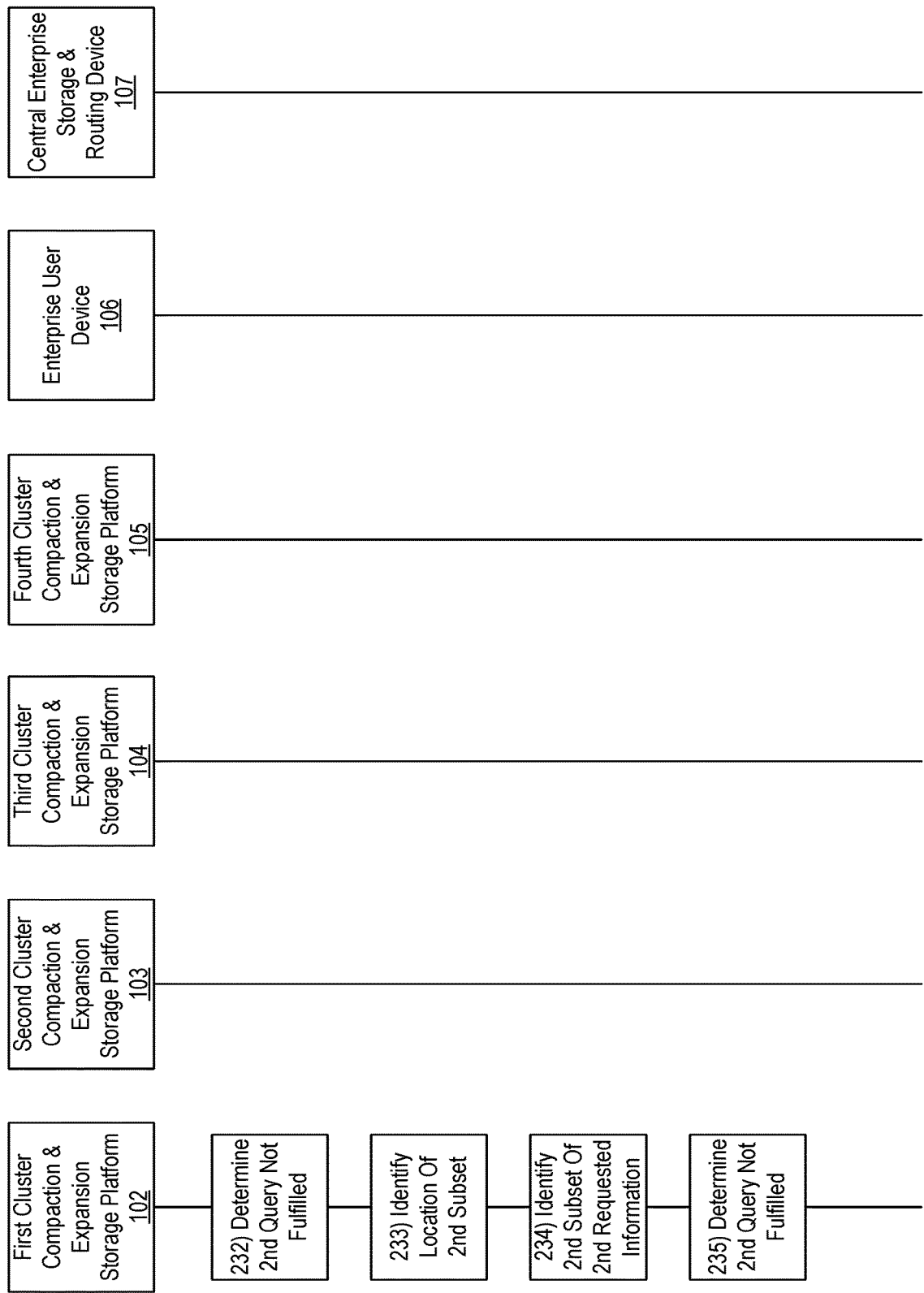

Referring to FIG. 2G, at step 232, the first cluster compaction and expansion storage platform 102 may compare the information identified at step 231 to the second request information. For example, the first cluster compaction and expansion storage platform 102 may compare the second request information to the first subset of the second request information to identify whether or not the second query has been satisfied in its entirety. For purposes of the illustrative event sequence described herein, it is assumed that at step 232, the first cluster compaction and expansion storage platform 102 determined that the second query was not fully satisfied based on the first subset of the second request information. As an example, the second query may specify that Person #1 has four addresses, and the first cluster compaction and expansion storage platform 102 may determine, because only Address #1 was identified in the first table, that the second query is not fully satisfied.

Additionally or alternatively, in analyzing the first table to identify the second request information, the first cluster compaction and expansion storage platform 102 may identify several data values in the first table (e.g., adjacency information) that do not have a defined node at the end of an edge represented by the adjacency information. For example, in analyzing the first table, the first cluster compaction and expansion storage platform 102 may identify a column associated with Person #2, and may identify four data values in the identified column with a data value of "lives at." In this example, however, of the four rows intersecting with the identified column at these "lives at" data values, only one of the rows may have a header defined as an address (e.g., Address #1). The remaining three rows may each be associated with a header that identifies a location (e.g., an internet protocol address of a storage location maintaining a table) where the addresses may be located. For example, the headers of these three rows may correspond to the internet protocol addresses of the second cluster compaction and expansion storage platform 103, the third cluster compaction and expansion storage platform 104, and the fourth cluster compaction and expansion storage platform 105, respectively. Accordingly, by identifying that locations of the second request information, rather than the second request information itself, are specified in the first table, the first cluster compaction and expansion storage platform 102 may determine that the second query has not been satisfied in its entirety. By storing adjacency information in this way, the first cluster compaction and expansion storage platform 102 may reduce an amount of locally stored data, which may improve network latency and query response time (e.g., because only the location of distributed data may be defined at the first cluster compaction and expansion storage platform rather than the distributed data itself). For example, by storing adjacency information in this way, the first cluster compaction and expansion storage platform 102 may store only rows associated with the first abstracted information cluster, and then a single row for each additional cluster compaction and expansion storage platform (e.g., one or more data values may be defined at an intersection of a column associated with Person #1 and a row associated with another cluster compaction and expansion storage platform, such as "lives at," "has an account number of," or the like).

At step 233, the first cluster compaction and expansion storage platform 102 may identify a location of a second subset of the second request information. In one or more instances, in determining the location of the second subset of the second request information, the first cluster compaction and expansion storage platform 102 may identify, using the first table, the location of the second subset of the second request information. For example, the first cluster compaction and expansion storage platform 102 may access a column or row of the first table associated with Person #1 (e.g., the header of the column or row may be "Person #1"), and may search within that column of row for a data value corresponding to "lives at," or some other similar language indicating residence information. In this example, once the first cluster compaction and expansion storage platform 102 identifies the data value corresponding to "lives at," the first cluster compaction and expansion storage platform 102 may identify, in the case that the column is associated with Person #1, a header of a row in the first table that intersects with the Person #1 column at the "lives at" data value (e.g., the header of the row may be a location of another address, such as an internet protocol address associated with one of the other cluster compaction and expansion storage platforms). In the case that the row is associated with Person #1, the first cluster compaction and expansion storage platform 102 may identify a location (e.g., an internet protocol address) associated with a column in the first table that intersects with the Person #1 row at the "lives at" data value (e.g., the header of the column may be the location of another one of the cluster compaction and expansion storage platforms). In doing so, the first cluster compaction and expansion storage platform 102 may identify an internet protocol address of a cluster compaction and expansion storage platform at which a second address is stored.

In some instances, in addition to or as an alternative to maintaining location data associated with other cluster compaction and expansion storage platforms in the first table, the first cluster compaction and expansion storage platform 102 may merely generate and send a request for the location data to the central enterprise storage and routing device 107. In these instances, the first cluster compaction and expansion storage platform 102 may generate one or more commands directing the central enterprise storage and routing device 107 to identify a location of the second subset of the second request information. In one or more instances, the first cluster compaction and expansion storage platform 102 may generate and send the request and/or one or more commands directing the central enterprise storage and routing device 107 to identify the location of the second subset of the second request information in response to determining that the second subset of the second request information is not locally stored. In response to receiving these one or more commands directing the central enterprise storage and routing device 107 to identify a location of the second subset of the second request information, the central enterprise storage and routing device 107 may access a stored table (e.g., a table) that contains a location value corresponding to all of the information received at step 201. For example, after routing the first abstracted information cluster, the second abstracted information cluster, the third information cluster, and the fourth abstracted information cluster to the various cluster compaction and expansion storage platforms at steps 203, 207, 211, and 215, the central enterprise storage and routing device 107 may maintain, in the stored table, location identifiers (e.g., internet protocol addresses, or the like), indicating where each piece of the information received at step 201 was sent for storage. In these instances, the central enterprise storage and routing device 107 may send, in response to the request and/or one or more commands directing the central enterprise storage and routing device 107 to identify the location of the second subset of the second request information, a message indicating the location of the second subset of the second request information.

Additionally or alternatively, in some instances, the first cluster compaction and expansion storage platform 102 might not be able to identify a location of the second subset of the second request information, and may send a query to each of the remaining compaction and expansion storage platforms to determine the second subset of the second request information. In these instances, the first cluster compaction and expansion storage platform 102 may generate and send one or more commands directing each of the remaining compaction and expansion storage platforms to determine the second subset of the second request information and provide it to the first cluster compaction and expansion storage platform 102.

To continue with the example described above, the first cluster compaction and expansion storage platform 102 may determine, using one or more of the methods described at step 233, that the second subset of the second request data is stored at the second cluster compaction and expansion storage platform 103.

At step 234, after determining a location of the second subset of the second request data, the first cluster compaction and expansion storage platform 102 may determine the second subset of the second request data. In some instances, the first cluster compaction and expansion storage platform 102 may access the second table, stored at the second cluster compaction and expansion storage platform 103, and may identify the second subset of the second request data using similar techniques to those described at step 231 with regard to identification of the first subset of the second request information.

For example, to continue with the particular example described above, the first cluster compaction and expansion storage platform 102 may identify, using the second table, another address of Person #1. For example, the first cluster compaction and expansion storage platform 102 may access a column or row of the second table associated with Person #1 (e.g., the header of the column or row may be "Person #1"), and may search within that column of row for a data value corresponding to "lives at," or some other similar language indicating residence information. In this example, once the first cluster compaction and expansion storage platform 102 identifies the data value corresponding to "lives at," the first cluster compaction and expansion storage platform 102 may identify, in the case that the column is associated with Person #1, an address associated with a row in the second table that intersects with the Person #1 column at the "lives at" data value (e.g., the header of the row may be Address #2). In the case that the row is associated with Person #1, the first cluster compaction and expansion storage platform 102 may identify an address associated with a column in the second table that intersects with the Person #1 row at the "lives at" data value (e.g., the header of the column may be Address #2). In doing so, the first cluster compaction and expansion storage platform 102 may identify a second address of Person #1, such as Address #2.

Additionally or alternatively, the first cluster compaction and expansion storage platform 102 may generate and send one or more commands directing the second cluster compaction and expansion storage platform 103 to identify the second subset of the second request information and to provide it to the first cluster compaction and expansion storage platform 102. In this example, in response to the one or more commands directing the second cluster compaction to identify the second subset of the second request information, the second cluster compaction and expansion storage platform 103 may perform similar techniques as described in the preceding paragraph, with regard to the second table, to identify the second subset of the second request information, and may then send the second subset of the second request information to the first cluster compaction and expansion storage platform 102.

In some instances, rather than sending the second subset of the second request information to the first cluster compaction and expansion storage platform 102, the second cluster compaction and expansion storage platform 103 may send the second subset of the second request information to the central enterprise storage and routing device 107. In these instances, each of the cluster compaction and expansion storage platforms involved in identifying the second request information may send, share, or otherwise provide their respective subsets of the second request information to the central enterprise storage and routing device 107, which may then ultimately compile a response to the second query, and send the response to the enterprise user device 106.

At step 235, the first cluster compaction and expansion storage platform 102 may compare the information identified at steps 231 and 234 to the second request information. For example, the first cluster compaction and expansion storage platform 102 may compare the second request information to the first and second subsets of the second request information to identify whether or not the second query has been satisfied in its entirety. For purposes of the illustrative event sequence described herein, it is assumed that at step 235 the first cluster compaction and expansion storage platform 102 determined that the second query was not fully satisfied based on the first and second subsets of the second request information. As an example, the second query may specify that Person #1 has four addresses, and the first cluster compaction and expansion storage platform 102 may determine, because only Address #1 and Address #2 have been identified, that the second query is not fully satisfied.

Additionally or alternatively, in analyzing the first table to identify the second request information, the first cluster compaction and expansion storage platform 102 may identify several data values in the first table (e.g., adjacency information) that do not have a defined node at the end of an edge represented by the adjacency information. For example, in analyzing the first table, the first cluster compaction and expansion storage platform 102 may identify a column associated with Person #2, and may identify four data values in the identified column with a data value of "lives at." In this example, however, of the four rows intersecting with the identified column at these "lives at" data values, only one of the rows may have a header defined as an address (e.g., Address #1). The remaining three rows may each be associated with a header that identifies a location (e.g., an internet protocol address of a storage location maintaining a table) where the addresses may be located. For example, the headers of these three rows may correspond to the internet protocol addresses of the second cluster compaction and expansion storage platform 103, the third cluster compaction and expansion storage platform 104, and the fourth cluster compaction and expansion storage platform 105, respectively. Accordingly, by identifying that locations of the second request information, other than the first cluster compaction and expansion storage platform 102 and the second cluster compaction and expansion storage platform 103, are specified, the first cluster compaction and expansion storage platform 102 may determine that the second query has not been satisfied in its entirety (e.g., Address #1 and Address #2 have been identified, but storage locations of two additional addresses are specified). By storing adjacency information in this way, the first cluster compaction and expansion storage platform 102 may reduce an amount of locally stored data, which may improve network latency and query response time (e.g., because only the location of distributed data may be defined at the first cluster compaction and expansion storage platform rather than the distributed data itself). For example, by storing adjacency information in this way, the first cluster compaction and expansion storage platform 102 may store only rows associated with the first abstracted information cluster, and then a single row for each additional cluster compaction and expansion storage platform (e.g., one or more data values may be defined at an intersection of a column associated with Person #1 and a row associated with another cluster compaction and expansion storage platform, such as "lives at," "has an account number of," or the like). Actions performed at step 235 may be similar to those described above at step 232.

Referring to FIG. 2H, at step 236, the first cluster compaction and expansion storage platform 102 may identify a location of a third subset of the second request information. In one or more instances, in determining the location of the third subset of the second request information, the first cluster compaction and expansion storage platform 102 may identify, using the first table, the location of the third subset of the second request information. For example, the first cluster compaction and expansion storage platform 102 may access a column or row of the first table associated with Person #1 (e.g., the header of the column or row may be "Person #1"), and may search within that column of row for a data value corresponding to "lives at," or some other similar language indicating residence information. In this example, once the first cluster compaction and expansion storage platform 102 identifies the data value corresponding to "lives at," the first cluster compaction and expansion storage platform 102 may identify, in the case that the column is associated with Person #1, a header of a row in the first table that intersects with the Person #1 column at the "lives at" data value (e.g., the header of the row may be a location of another address, such as an internet protocol address associated with one of the other cluster compaction and expansion storage platforms). In the case that the row is associated with Person #1, the first cluster compaction and expansion storage platform 102 may identify a location (e.g., an internet protocol address) associated with a column in the first table that intersects with the Person #1 row at the "lives at" data value (e.g., the header of the column may be the location of another one of the cluster compaction and expansion storage platforms). In doing so, the first cluster compaction and expansion storage platform 102 may identify an internet protocol address of a cluster compaction and expansion storage platform at which a third address is stored.

In some instances, in addition to or as an alternative to maintaining location data associated with other cluster compaction and expansion storage platforms in the first table, the first cluster compaction and expansion storage platform 102 may merely generate and send a request for the location data to the central enterprise storage and routing device 107. In these instances, the first cluster compaction and expansion storage platform 102 may generate one or more commands directing the central enterprise storage and routing device 107 to identify a location of the third subset of the second request information. In one or more instances, the first cluster compaction and expansion storage platform 102 may generate and send the request and/or one or more commands directing the central enterprise storage and routing device 107 to identify the location of the third subset of the second request information in response to determining that the third subset of the second request information is not locally stored. In response to receiving these one or more commands directing the central enterprise storage and routing device 107 to identify a location of the third subset of the second request information, the central enterprise storage and routing device 107 may access a stored table (e.g., a table) that contains a location value corresponding to all of the information received at step 201. For example, after routing the first abstracted information cluster, the second abstracted information cluster, the third information cluster, and the fourth abstracted information cluster to the various cluster compaction and expansion storage platforms at steps 203, 207, 211, and 215, the central enterprise storage and routing device 107 may maintain, in the stored table, location identifiers (e.g., internet protocol addresses, or the like), indicating where each piece of the information received at step 201 was sent for storage. In these instances, the central enterprise storage and routing device 107 may send, in response to the request and/or one or more commands directing the central enterprise storage and routing device 107 to identify the location of the third subset of the second request information, a message indicating the location of the third subset of the second request information.

Additionally or alternatively, in some instances, the first cluster compaction and expansion storage platform 102 might not be able to identify a location of the third subset of the second request information, and may send a query to each of the remaining compaction and expansion storage platforms to determine the third subset of the second request information. In these instances, the first cluster compaction and expansion storage platform 102 may generate and send one or more commands directing each of the remaining compaction and expansion storage platforms to determine the third subset of the second request information and provide it to the first cluster compaction and expansion storage platform 102.

To continue with the example described above, the first cluster compaction and expansion storage platform 102 may determine, using one or more of the methods described at step 236, that the third subset of the second request data is stored at the third cluster compaction and expansion storage platform 104. Actions performed at step 236 may be similar to those described above regard to the second subset of the second request data at step 233.

At step 237, after determining a location of the third subset of the second request data, the first cluster compaction and expansion storage platform 102 may determine the third subset of the second request data. In some instances, the first cluster compaction and expansion storage platform 102 may access the third table, stored at the third cluster compaction and expansion storage platform 104, and may identify the third subset of the second request data using similar techniques to those described at step 231 with regard to identification of the first subset of the second request information and step 234 with regard to identification of the second subset of the second request information.

For example, to continue with the particular example described above, the first cluster compaction and expansion storage platform 102 may identify, using the third table, another address of Person #1. For example, the first cluster compaction and expansion storage platform 102 may access a column or row of the second table associated with Person #1 (e.g., the header of the column or row may be "Person #1"), and may search within that column of row for a data value corresponding to "lives at," or some other similar language indicating residence information. In this example, once the first cluster compaction and expansion storage platform 102 identifies the data value corresponding to "lives at," the first cluster compaction and expansion storage platform 102 may identify, in the case that the column is associated with Person #1, an address associated with a row in the third table that intersects with the Person #1 column at the "lives at" data value (e.g., the header of the row may be Address #3). In the case that the row is associated with Person #1, the first cluster compaction and expansion storage platform 102 may identify an address associated with a column in the third table that intersects with the Person #1 row at the "lives at" data value (e.g., the header of the column may be Address #3). In doing so, the first cluster compaction and expansion storage platform 102 may identify a third address of Person #1, such as Address #3.

Additionally or alternatively, the first cluster compaction and expansion storage platform 102 may generate and send one or more commands directing the third cluster compaction and expansion storage platform 104 to identify the third subset of the second request information and to provide it to the first cluster compaction and expansion storage platform 102. In this example, in response to the one or more commands directing the third cluster compaction to identify the third subset of the second request information, the third cluster compaction and expansion storage platform 104 may perform similar techniques as described in the preceding paragraph, with regard to the third table, to identify the third subset of the second request information, and may then send the third subset of the second request information to the first cluster compaction and expansion storage platform 102.

In some instances, rather than sending the third subset of the second request information to the first cluster compaction and expansion storage platform 102, the third cluster compaction and expansion storage platform 103 may send the third subset of the second request information to the central enterprise storage and routing device 107. In these instances, each of the cluster compaction and expansion storage platforms involved in identifying the second request information may send, share, or otherwise provide their respective subsets of the second request information to the central enterprise storage and routing device 107, which may then ultimately compile a response to the second query, and send the response to the enterprise user device 106. Actions performed at step 237 may be similar to those described above with regard to the second subset of the second request information at step 234.

At step 238, the first cluster compaction and expansion storage platform 102 may compare the information identified at steps 231, 234, and 237 to the second request information. For example, the first cluster compaction and expansion storage platform 102 may compare the second request information to the first, second, and third subsets of the second request information to identify whether or not the second query has been satisfied in its entirety. For purposes of the illustrative event sequence described herein, it is assumed that at step 238 the first cluster compaction and expansion storage platform 102 determined that the second query was not fully satisfied based on the first, second, and third subsets of the second request information. As an example, the second query may specify that Person #1 has four addresses, and the first cluster compaction and expansion storage platform 102 may determine, because only Address #1, Address #2, and Address #3 have been identified, that the second query is not fully satisfied.

Additionally or alternatively, in analyzing the first table to identify the second request information, the first cluster compaction and expansion storage platform 102 may identify several data values in the first table (e.g., adjacency information) that do not have a defined node at the end of an edge represented by the adjacency information. For example, in analyzing the first table, the first cluster compaction and expansion storage platform 102 may identify a column associated with Person #2, and may identify four data values in the identified column with a data value of "lives at." In this example, however, of the four rows intersecting with the identified column at these "lives at" data values, only one of the rows may have a header defined as an address (e.g., Address #1). The remaining three rows may each be associated with a header that identifies a location (e.g., an internet protocol address of a storage location maintaining a table) where the addresses may be located. For example, the headers of these three rows may correspond to the internet protocol addresses of the second cluster compaction and expansion storage platform 103, the third cluster compaction and expansion storage platform 104, and the fourth cluster compaction and expansion storage platform 105, respectively. Accordingly, by identifying that locations of the second request information, other than the first cluster compaction and expansion storage platform 102, the second cluster compaction and expansion storage platform 103, and the third cluster compaction and expansion storage platform 104 are specified, the first cluster compaction and expansion storage platform 102 may determine that the second query has not been satisfied in its entirety (e.g., Address #1, Address #2, and Address #3 have been identified, but a storage location of an additional address is specified). By storing adjacency information in this way, the first cluster compaction and expansion storage platform 102 may reduce an amount of locally stored data, which may improve network latency and query response time (e.g., because only the location of distributed data may be defined at the first cluster compaction and expansion storage platform rather than the distributed data itself). For example, by storing adjacency information in this way, the first cluster compaction and expansion storage platform 102 may store only rows associated with the first abstracted information cluster, and then a single row for each additional cluster compaction and expansion storage platform (e.g., one or more data values may be defined at an intersection of a column associated with Person #1 and a row associated with another cluster compaction and expansion storage platform, such as "lives at," "has an account number of," or the like). Actions performed at step 238 may be similar to those described above at steps 232 and 235.

At step 239, the first cluster compaction and expansion storage platform 102 may identify a location of a fourth subset of the second request information. In one or more instances, in determining the location of the fourth subset of the second request information, the first cluster compaction and expansion storage platform 102 may identify, using the first table, the location of the fourth subset of the second request information. For example, the first cluster compaction and expansion storage platform 102 may access a column or row of the first table associated with Person #1 (e.g., the header of the column or row may be "Person #1"), and may search within that column of row for a data value corresponding to "lives at," or some other similar language indicating residence information. In this example, once the first cluster compaction and expansion storage platform 102 identifies the data value corresponding to "lives at," the first cluster compaction and expansion storage platform 102 may identify, in the case that the column is associated with Person #1, a header of a row in the first table that intersects with the Person #1 column at the "lives at" data value (e.g., the header of the row may be a location of another address, such as an internet protocol address associated with one of the other cluster compaction and expansion storage platforms). In the case that the row is associated with Person #1, the first cluster compaction and expansion storage platform 102 may identify a location (e.g., an internet protocol address) associated with a column in the first table that intersects with the Person #1 row at the "lives at" data value (e.g., the header of the column may be the location of another one of the cluster compaction and expansion storage platforms). In doing so, the first cluster compaction and expansion storage platform 102 may identify an internet protocol address of a cluster compaction and expansion storage platform at which a fourth address is stored.

In some instances, in addition to or as an alternative to maintaining location data associated with other cluster compaction and expansion storage platforms in the first table, the first cluster compaction and expansion storage platform 102 may merely generate and send a request for the location data to the central enterprise storage and routing device 107. In these instances, the first cluster compaction and expansion storage platform 102 may generate one or more commands directing the central enterprise storage and routing device 107 to identify a location of the fourth subset of the second request information. In one or more instances, the first cluster compaction and expansion storage platform 102 may generate and send the request and/or one or more commands directing the central enterprise storage and routing device 107 to identify the location of the fourth subset of the second request information in response to determining that the fourth subset of the second request information is not locally stored. In response to receiving these one or more commands directing the central enterprise storage and routing device 107 to identify a location of the fourth subset of the second request information, the central enterprise storage and routing device 107 may access a stored table (e.g., a table) that contains a location value corresponding to all of the information received at step 201. For example, after routing the first abstracted information cluster, the second abstracted information cluster, the third information cluster, and the fourth abstracted information cluster to the various cluster compaction and expansion storage platforms at steps 203, 207, 211, and 215, the central enterprise storage and routing device 107 may maintain, in the stored table, location identifiers (e.g., internet protocol addresses, or the like), indicating where each piece of the information received at step 201 was sent for storage. In these instances, the central enterprise storage and routing device 107 may send, in response to the request and/or one or more commands directing the central enterprise storage and routing device 107 to identify the location of the fourth subset of the second request information, a message indicating the location of the fourth subset of the second request information.

Additionally or alternatively, in some instances, the first cluster compaction and expansion storage platform 102 might not be able to identify a location of the fourth subset of the second request information, and may send a query to each of the remaining compaction and expansion storage platforms to determine the fourth subset of the second request information. In these instances, the first cluster compaction and expansion storage platform 102 may generate and send one or more commands directing each of the remaining compaction and expansion storage platforms to determine the fourth subset of the second request information and provide it to the first cluster compaction and expansion storage platform 102.

To continue with the example described above, the first cluster compaction and expansion storage platform 102 may determine, using one or more of the methods described at step 239, that the fourth subset of the second request data is stored at the fourth cluster compaction and expansion storage platform 104. Actions performed at step 239 may be similar to those described above regard to the second subset of the second request data at steps 233 and 236.

Referring to FIG. 2I, at step 240, after determining a location of the fourth subset of the second request data, the first cluster compaction and expansion storage platform 102 may determine the fourth subset of the second request data. In some instances, the first cluster compaction and expansion storage platform 102 may access the fourth table, stored at the fourth cluster compaction and expansion storage platform 105, and may identify the fourth subset of the second request data using similar techniques to those described at step 231 with regard to identification of the first subset of the second request information, step 234 with regard to identification of the second subset of the second request information, and step 236 with regard to identification of the third subset of the second request information.

For example, to continue with the particular example described above, the first cluster compaction and expansion storage platform 102 may identify, using the fourth table, another address of Person #1. For example, the first cluster compaction and expansion storage platform 102 may access a column or row of the second table associated with Person #1 (e.g., the header of the column or row may be "Person #1"), and may search within that column of row for a data value corresponding to "lives at," or some other similar language indicating residence information. In this example, once the first cluster compaction and expansion storage platform 102 identifies the data value corresponding to "lives at," the first cluster compaction and expansion storage platform 102 may identify, in the case that the column is associated with Person #1, an address associated with a row in the fourth table that intersects with the Person #1 column at the "lives at" data value (e.g., the header of the row may be Address #4). In the case that the row is associated with Person #1, the first cluster compaction and expansion storage platform 102 may identify an address associated with a column in the fourth table that intersects with the Person #1 row at the "lives at" data value (e.g., the header of the column may be Address #4). In doing so, the first cluster compaction and expansion storage platform 102 may identify a fourth address of Person #1, such as Address #4.

Additionally or alternatively, the first cluster compaction and expansion storage platform 102 may generate and send one or more commands directing the fourth cluster compaction and expansion storage platform 105 to identify the fourth subset of the second request information and to provide it to the first cluster compaction and expansion storage platform 102. In this example, in response to the one or more commands directing the fourth cluster compaction to identify the fourth subset of the second request information, the fourth cluster compaction and expansion storage platform 105 may perform similar techniques as described in the preceding paragraph, with regard to the fourth table, to identify the fourth subset of the second request information, and may then send the fourth subset of the second request information to the first cluster compaction and expansion storage platform 102.

In some instances, rather than sending the fourth subset of the second request information to the first cluster compaction and expansion storage platform 102, the fourth cluster compaction and expansion storage platform 103 may send the fourth subset of the second request information to the central enterprise storage and routing device 107. In these instances, each of the cluster compaction and expansion storage platforms involved in identifying the second request information may send, share, or otherwise provide their respective subsets of the second request information to the central enterprise storage and routing device 107, which may then ultimately compile a response to the second query, and send the response to the enterprise user device 106. Actions performed at step 240 may be similar to those described above with regard to the second subset of the second request information at step 234 and the third subset of the second request information at step 237.

At step 241, the first cluster compaction and expansion storage platform 102 may compare the information identified at steps 231, 234, 237, and 240 to the second request information. For example, the first cluster compaction and expansion storage platform 102 may compare the second request information to the first, second, third, and fourth subsets of the second request information to identify whether or not the second query has been satisfied in its entirety. For purposes of the illustrative event sequence described herein, it is assumed that at step 241 the first cluster compaction and expansion storage platform 102 determined that the second query was fully satisfied based on the first, second, third, and fourth subsets of the second request information. As an example, the second query may specify that Person #1 has four addresses, and the first cluster compaction and expansion storage platform 102 may determine, because Address #1, Address #2, Address #3, and Address #4 have been identified, that the second query is fully satisfied.

Additionally or alternatively, in analyzing the first table to identify the second request information, the first cluster compaction and expansion storage platform 102 may identify several data values in the first table (e.g., adjacency information) that do not have a defined node at the end of an edge represented by the adjacency information. For example, in analyzing the first table, the first cluster compaction and expansion storage platform 102 may identify a column associated with Person #2, and may identify four data values in the identified column with a data value of "lives at." In this example, however, of the four rows intersecting with the identified column at these "lives at" data values, only one of the rows may have a header defined as an address (e.g., Address #1). The remaining three rows may each be associated with a header that identifies a location (e.g., an internet protocol address of a storage location maintaining a table) where the addresses may be located. For example, the headers of these three rows may correspond to the internet protocol addresses of the second cluster compaction and expansion storage platform 103, the third cluster compaction and expansion storage platform 104, and the fourth cluster compaction and expansion storage platform 105, respectively. Accordingly, by identifying that no additional locations of the second request information, other than the first cluster compaction and expansion storage platform 102, the second cluster compaction and expansion storage platform 103, the third cluster compaction and expansion storage platform 104, and the fourth cluster compaction and expansion storage platform 105 are specified, the first cluster compaction and expansion storage platform 102 may determine that the second query has been satisfied in its entirety (e.g., Address #1, Address #2, Address #3, and Address #4 have all been identified). By storing adjacency information in this way, the first cluster compaction and expansion storage platform 102 may reduce an amount of locally stored data, which may improve network latency and query response time (e.g., because only the location of distributed data may be defined at the first cluster compaction and expansion storage platform rather than the distributed data itself). For example, by storing adjacency information in this way, the first cluster compaction and expansion storage platform 102 may store only rows associated with the first abstracted information cluster, and then a single row for each additional cluster compaction and expansion storage platform (e.g., one or more data values may be defined at an intersection of a column associated with Person #1 and a row associated with another cluster compaction and expansion storage platform, such as "lives at," "has an account number of," or the like). Actions performed at step 241 may be similar to those described above at steps 232, 235, and 238; however, at step 241, the first cluster compaction and expansion storage platform 102 may determine that the second query has been satisfied in its entirety.

At step 242, the first cluster compaction and expansion storage platform 102 may generate a second query response using first, second, third, and fourth subsets of the second request information. For example, the first cluster compaction and expansion storage platform 102 may generate a first query response indicating the addresses of Person #1 are Address #1, Address #2, Address #3, and Address #4. Actions performed at step 242 may be similar to those described above with regard to the first query response at step 224.

At step 243, the first cluster compaction and expansion storage platform 102 may send the second query response, generated at step 242, to the enterprise user device 106. In one or more instances, the first cluster compaction and expansion storage platform 102 may send the second query response to the enterprise user device 106 via the communication interface 113 and while the fifth wireless data connection is established. In one or more instances, the first cluster compaction and expansion storage platform 102 may generate and send, along with the second query response, one or more commands directing the enterprise user device 106 to display a second query response interface based on the second query response. Actions performed at step 243 may be similar to those described above with regard to step 225.

At step 244, the enterprise user device 106 may receive the second query response from the first cluster compaction and expansion storage platform 102. In one or more instances, the enterprise user device 106 may receive the second query response from the first cluster compaction and expansion storage platform 102 while the fifth wireless data connection is established. In some instances, the enterprise user device 106 may also receive the one or more commands directing the enterprise user device 106 to display a second query response interface based on the second query response. Actions performed at step 244 may be similar to those described above with regard to step 226.

Figure 2J:
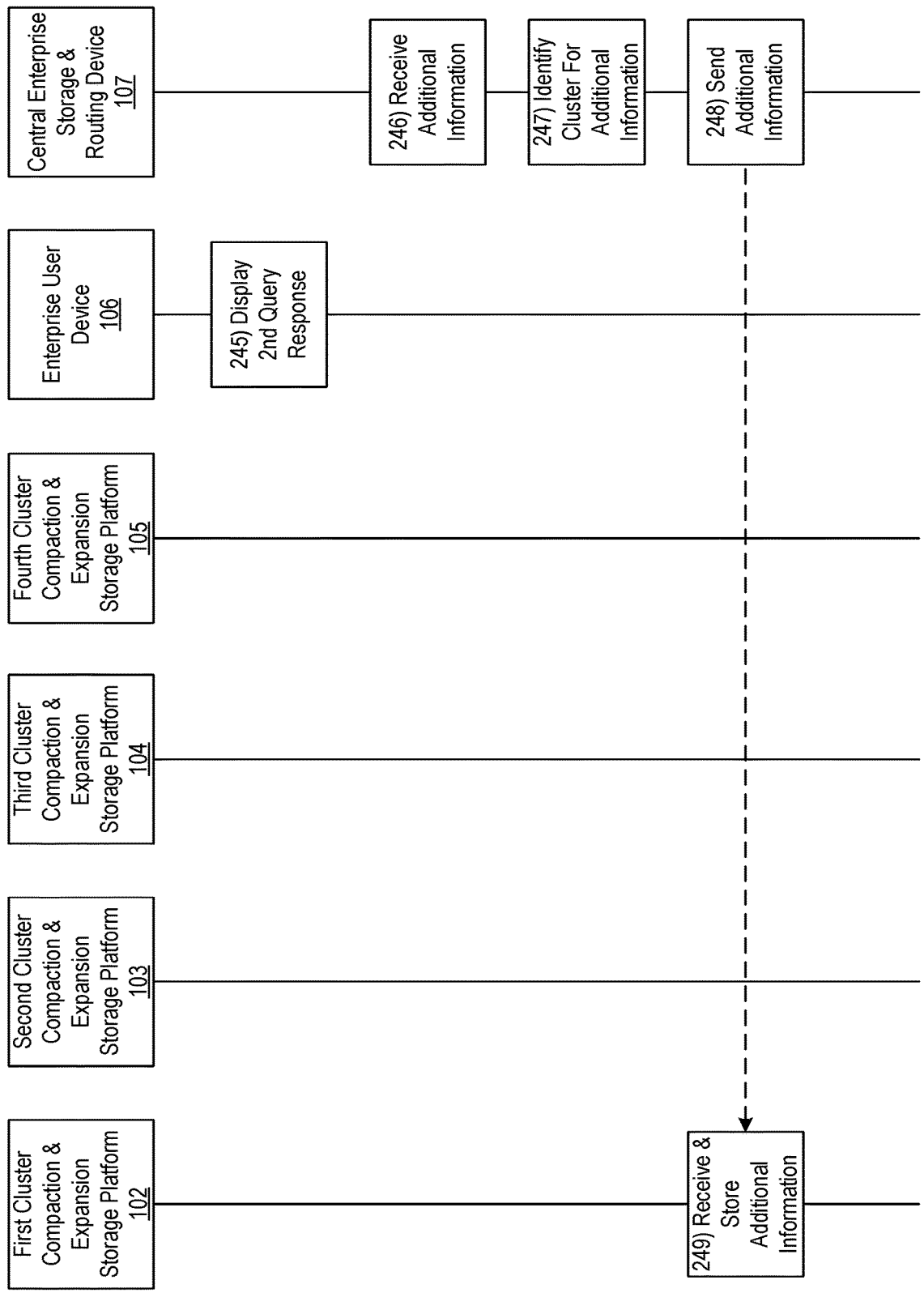

Referring to FIG. 2J, at step 245, the enterprise user device 106 may generate and display a second query response interface based on the second query response. In some instances, the enterprise user device 106 may generate and display the second query response interface in response to the one or more commands directing the enterprise user device 106 to display the second query response interface based on the second query response. In some instances, in displaying the second query response interface, the enterprise user device 106 may display a graphical user interface similar to graphical user interface 405, which is shown in FIG. 4. For example, the enterprise user device 106 may display an interface indicating a plurality of addresses associated with an individual, as described in the example of steps 228-244.

At step 246, the central enterprise storage and routing device 107 may receive additional information. For example, the central enterprise storage and routing device 107 may receive additional information, similar to the information received at step 201, which has not already been routed to a cluster compaction and expansion storage platform for storage. Actions performed at step 246 may be similar to those described above with regard to step 201.

At step 247, the central enterprise storage and routing device 107 may identify cluster compaction and expansion storage platforms at which to store the additional information. Actions performed at step 247 may be similar to those described above with regard to step 202. As an example, the central enterprise storage and routing device 107 may determine that the additional information is related to the first abstracted information cluster, and thus may determine that the additional information should be stored at the first cluster compaction and expansion storage platform 102.

At step 248, in response to identifying the first cluster compaction and expansion storage platform 102 for storage of the additional information, the central enterprise storage and routing device 107 may send the additional information to the first cluster compaction and expansion storage platform 102. In one or more instances, the central enterprise storage and routing device 107 may send the additional information to the first cluster compaction and expansion storage platform 102 while the first wireless data connection is established. Actions performed at step 248 may be similar to those described above with regard to step 203.

At step 249, the first cluster compaction and expansion storage platform 102 may receive and store the additional information sent at step 248. In some instances, the first cluster compaction and expansion storage platform 102 may receive the first abstracted information cluster via the communication interface 113 and while the first wireless data connection is established.

Figure 2K:
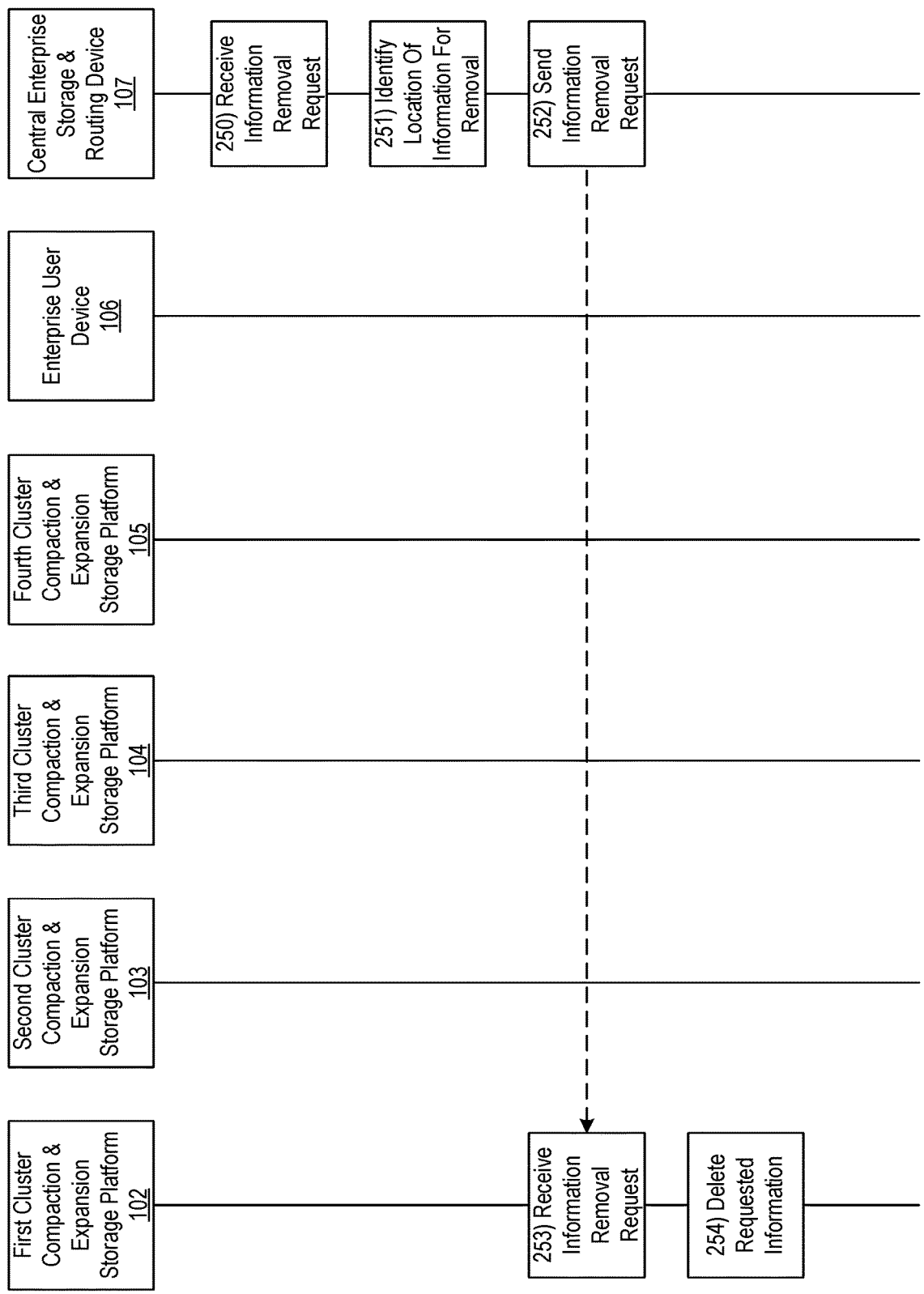

Referring to FIG. 2K, at step 250, the central enterprise storage and routing device 107 may receive a request to remove information stored at one of the cluster compaction and expansion storage platforms. For example, the central enterprise storage and routing device 107 may receive a message indicating that a piece of information is expired, no longer accurate, or the like.

At step 251, the central enterprise storage and routing device 107 may identify a location of the information, specified at step 250, for removal. For example, the central enterprise storage and routing device 107 may access a stored table (e.g., a table) containing the information previously routed for storage at the cluster compaction and expansion storage platforms and a location identifier (e.g., an internet protocol address of the respective cluster compaction and expansion storage platforms). For purposes of the illustrative example described herein, it is assumed that at step 252 the central enterprise storage and routing device 107 identified the first cluster compaction and expansion storage platform 102 as a host of the information to be removed.

At step 252, the central enterprise storage and routing device 107 may send an information removal request to the first cluster compaction and expansion storage platform 102, requesting that the requested information be deleted from the first cluster compaction and expansion storage platform 102. In some instances, the central enterprise storage and routing device 107 may send the information removal request while the first wireless data connection is established.

At step 253, the first cluster compaction and expansion storage platform 102 may receive the information removal request sent at step 252. In some instances, the first cluster compaction and expansion storage platform 102 may receive the information removal request via the communication interface 113 and while the first wireless data connection was established.

At step 254, the first cluster compaction and expansion storage platform 102 may delete the information specified in the information removal request. For example, the first cluster compaction and expansion storage platform 102 may remove the information from the first table. Accordingly, by dynamically adding and removing data from the cluster compaction and expansion storage platforms, the central enterprise storage and routing device 107 may maintain an accurate and complete distributed data storage system, which may achieve technical advantages (e.g., increase accuracy of query responses) over a stagnant knowledge graph that is not updated in real time.

Although steps 201-254 are primarily described with regard to first cluster compaction and expansion storage platform 102, second cluster compaction and expansion storage platform 103, third cluster compaction and expansion storage platform 104, and fourth cluster compaction and expansion storage platform 105, it should be understood that any number of cluster compaction and expansion storage platforms may be implemented in alternative arrangements of the methods described herein.

Figure 5:
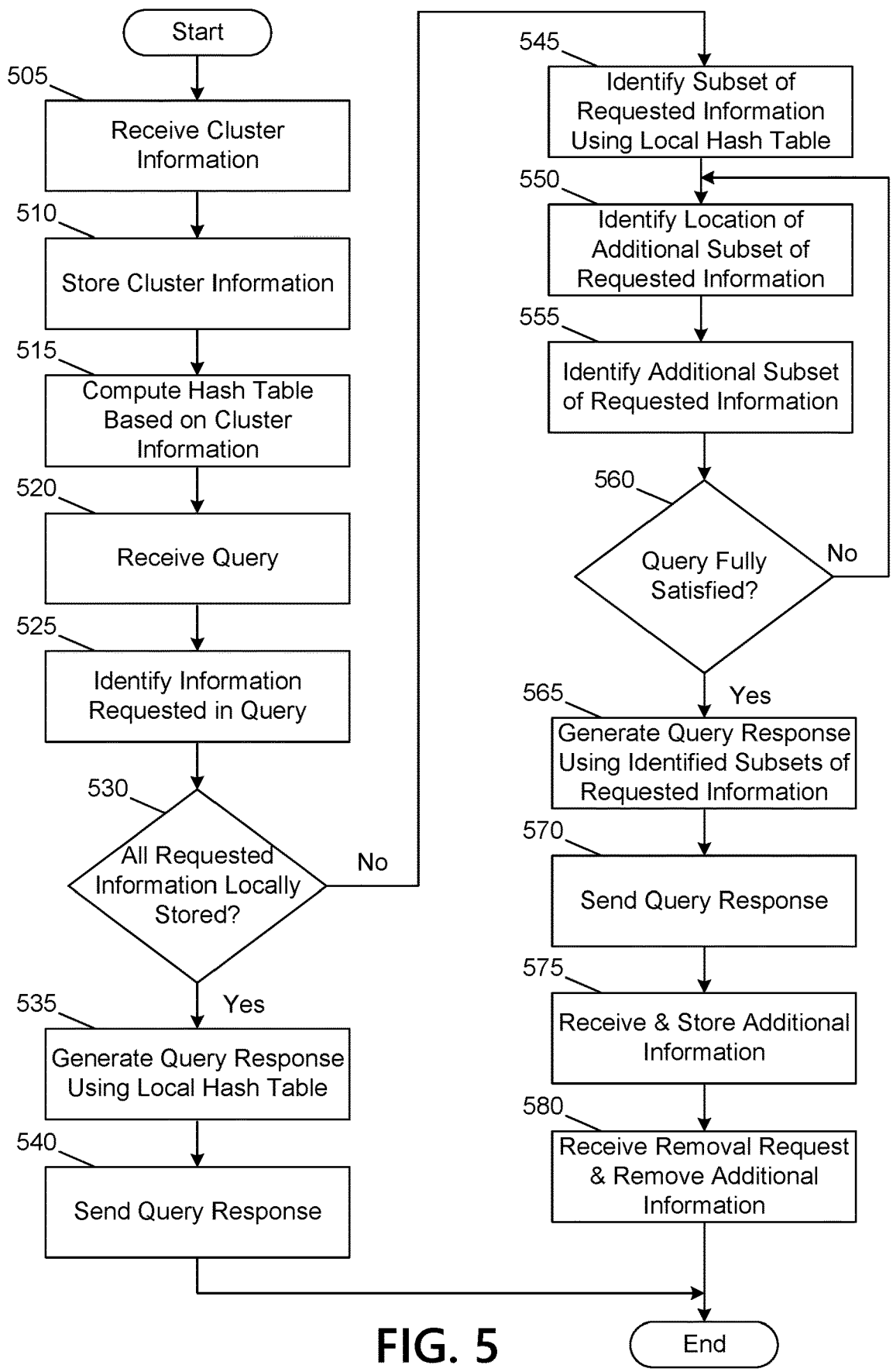
FIG. 5 depicts an illustrative method for implementing dynamic cluster compaction and expansion for query processing in accordance with one or more example embodiments.

FIG. 5 depicts an illustrative method that implements dynamic cluster compaction and expansion for query processing in accordance with one or more example embodiments. Referring to FIG. 5, at step 505, a computing platform having at least one processor, a communication interface, and memory may receive cluster information (e.g., the first abstracted information cluster). At step 510, the computing platform may store the cluster information as a knowledge graph (e.g., the knowledge graph). At step 515, the computing platform may compute a table based on the knowledge graph (e.g., the first table). At step 520, the computing platform may receive a query (e.g., the first query, the second query, or the like). At step 525, the computing platform may identify information requested in the query (e.g., the first request information, the second request information, or the like). At step 530, the computing platform may determine whether all requested information is locally stored, or if the requested information is stored across multiple distributed computing platforms. If the computing platform determines that all requested information is locally stored, the computing platform may proceed to step 535. If the computing platform determines that all requested information is not locally stored, the computing platform may proceed to step 545.

At step 535, the computing platform may generate a query response (e.g., the first query response) using a local table (e.g., the first table). At step 540, the computing platform may send the query response generated at step 535.

At step 545, the computing platform may identify a subset of the requested information (e.g., the first subset of the second request information) using the local table (e.g., the first table). At step 550, the computing platform may identify a location of an additional subset of the requested information (e.g., the second, third, and/or fourth subset of the second request information). At step 555, the computing platform may determine the additional subset of the requested information (e.g., the second, third, and/or fourth subset of the second request information. At step 560, the computing platform may determine whether or not the query (e.g., the second query) has been fully satisfied. If the query has not been fully satisfied, the computing platform may return to step 550. If the query has been fully satisfied, the computing platform may proceed to step 565.

At step 565, the computing platform may generate a query response (e.g., the second query response) using the identified subsets of the requested information (e.g., the first, second, third, and/or fourth subsets of the second request information). At step 570, the computing platform may send the query response generated at step 565. At step 575, the computing platform may receive and store additional information. At step 580, the computing platform may receive a removal request and remove the information requested for removal.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device.

The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive information associated with a first abstracted information cluster;
      store the information associated with the first abstracted information cluster as a first table containing the information associated with the first abstracted information cluster and corresponding adjacency information;
      receive a query requesting a subset of the information associated with the first abstracted information cluster and additional information not associated with the first abstracted information cluster;
      identify, using first the table, the subset of the information associated with the first abstracted information cluster and corresponding adjacency information;
      identify a location of the additional information not associated with the first abstracted information cluster;
      access, from the identified location of the additional information not associated with the first abstracted information cluster, a second table containing: the additional information not associated with the first abstracted information cluster, and corresponding adjacency information; and
      send a response to the query, based on:
         the subset of the information associated with the first abstracted information cluster and the corresponding adjacency information, and
         the additional information not associated with the first abstracted information cluster, and the corresponding adjacency information.

2. The computing platform of claim 1, wherein identifying the location of the additional information not associated with the first abstracted information cluster comprises:
   determining that the additional information not associated with the first abstracted information cluster is not stored locally at the computing platform;
   sending, to a central enterprise storage and routing device and in response to determining that the additional information not associated with the first abstracted information cluster is not stored locally at the computing platform, a request for a location of the additional information not associated with the first abstracted information cluster; and
   receiving, in response to the request for the location of the additional information not associated with the first abstracted information cluster, a message indicating the location of the additional information not associated with the first abstracted information cluster, wherein the location of the additional information not associated with the first abstracted information cluster comprises the second table.

3. The computing platform of claim 1, wherein identifying the location of the additional information not associated with the first abstracted information cluster comprises:
   determining that the additional information not associated with the first abstracted information cluster is not stored locally at the computing platform; and
   identifying, using the first table, a location of the additional information not associated with the first abstracted information cluster, wherein the location of the additional information not associated with the first abstracted information cluster comprises the second table.

4. The computing platform of claim 1, wherein identifying the location of the additional information not associated with the first abstracted information cluster comprises identifying another computing platform, different than the computing platform, where the additional information not associated with the first abstracted information cluster is stored.

5. The computing platform of claim 1, wherein accessing the second table comprises:
generating one or more commands directing another computing platform, on which the second table is stored, to provide the additional information not associated with the first abstracted information cluster; and
receiving, in response to the one or more commands directing the other computing platform, on which the second table is stored, to provide the additional information not associated with the first abstracted information cluster, the additional information not associated with the first abstracted information cluster.

6. The computing platform of claim 1, wherein the memory stores additional computer-readable instructions that, when executed by the at least one processor, further cause the computing platform to:
determine that the additional information not associated with the first abstracted information cluster is stored in a second abstracted information cluster, different than the first abstracted information cluster.

7. The computing platform of claim 6, wherein the first abstracted information cluster corresponds to a first social network and the second abstracted information cluster corresponds to a second social network.

8. The computing platform of claim 6, wherein the first abstracted information cluster corresponds to a first geographic region and the second abstracted information cluster corresponds to a second geographic region.

9. The computing platform of claim 6, wherein adjacency information for the second abstracted information cluster is stored at another computing platform and is not stored at the computing platform.

10. A method comprising:
at a computing platform comprising at least one processor, a communication interface, and memory:
receiving information associated with a first abstracted information cluster;
storing the information associated with the first abstracted information cluster as a first table containing the information associated with the first abstracted information cluster and corresponding adjacency information;
receiving a query requesting a subset of the information associated with the first abstracted information cluster and additional information not associated with the first abstracted information cluster;
identifying, using first the table, the subset of the information associated with the first abstracted information cluster and corresponding adjacency information;
identifying a location of the additional information not associated with the first abstracted information cluster;
accessing, from the identified location of the additional information not associated with the first abstracted information cluster, a second table containing: the additional information not associated with the first abstracted information cluster, and corresponding adjacency information; and
sending a response to the query, based on:
the subset of the information associated with the first abstracted information cluster and the corresponding adjacency information, and
the additional information not associated with the first abstracted information cluster, and the corresponding adjacency information.

11. The method of claim 10, wherein identifying the location of the additional information not associated with the first abstracted information cluster comprises:
determining that the additional information not associated with the first abstracted information cluster is not stored locally at the computing platform;
sending, to a central enterprise storage and routing device and in response to determining that the additional information not associated with the first abstracted information cluster is not stored locally at the computing platform, a request for a location of the additional information not associated with the first abstracted information cluster; and
receiving, in response to the request for the location of the additional information not associated with the first abstracted information cluster, a message indicating the location of the additional information not associated with the first abstracted information cluster, wherein the location of the additional information not associated with the first abstracted information cluster comprises the second table.

12. The method of claim 10, wherein identifying the location of the additional information not associated with the first abstracted information cluster comprises:
determining that the additional information not associated with the first abstracted information cluster is not stored locally at the computing platform; and
identifying, using the first table, a location of the additional information not associated with the first abstracted information cluster, wherein the location of the additional information not associated with the first abstracted information cluster comprises the second table.

13. The method of claim 10, wherein identifying the location of the additional information not associated with the first abstracted information cluster comprises identifying another computing platform, different than the computing platform, where the additional information not associated with the first abstracted information cluster is stored.

14. The method of claim 10, wherein accessing the second table comprises:
generating one or more commands directing another computing platform, on which the second table is stored, to provide the additional information not associated with the first abstracted information cluster; and
receiving, in response to the one or more commands directing the other computing platform, on which the second table is stored, to provide the additional information not associated with the first abstracted information cluster, the additional information not associated with the first abstracted information cluster.

15. The method of claim 10, further comprising:
determining that the additional information not associated with the first abstracted information cluster is stored in a second abstracted information cluster, different than the first abstracted information cluster.

16. The method of claim 15, wherein the first abstracted information cluster corresponds to a first social network and the second abstracted information cluster corresponds to a second social network.

17. The method of claim 15, wherein the first abstracted information cluster corresponds to a first geographic region and the second abstracted information cluster corresponds to a second geographic region.

18. The method of claim 15, wherein adjacency information for the second abstracted information cluster is stored at another computing platform and is not stored at the computing platform.

19. One or more non-transitory computer-readable media storing instructions that, when executed by a computing platform comprising at least one processor, a communication interface, and memory, cause the computing platform to:
- receive information associated with a first abstracted information cluster;
- store the information associated with the first abstracted information cluster as a first table containing the information associated with the first abstracted information cluster and corresponding adjacency information;
- receive a query requesting a subset of the information associated with the first abstracted information cluster and additional information not associated with the first abstracted information cluster;
- identify, using first the table, the subset of the information associated with the first abstracted information cluster and corresponding adjacency information;
- identify a location of the additional information not associated with the first abstracted information cluster;
- access, from the identified location of the additional information not associated with the first abstracted information cluster, a second table containing: the additional information not associated with the first abstracted information cluster, and corresponding adjacency information; and
- send a response to the query, based on:
  - the subset of the information associated with the first abstracted information cluster and the corresponding adjacency information, and
  - the additional information not associated with the first abstracted information cluster, and the corresponding adjacency information.

20. The one or more non-transitory computer-readable media of claim 19, wherein identifying the location of the additional information not associated with the first abstracted information cluster comprises:
- determining that the additional information not associated with the first abstracted information cluster is not stored locally at the computing platform;
- sending, to a central enterprise storage and routing device and in response to determining that the additional information not associated with the first abstracted information cluster is not stored locally at the computing platform, a request for a location of the additional information not associated with the first abstracted information cluster; and
- receiving, in response to the request for the location of the additional information not associated with the first abstracted information cluster, a message indicating the location of the additional information not associated with the first abstracted information cluster, wherein the location of the additional information not associated with the first abstracted information cluster comprises the second table.

* * * * *